United States Patent [19]

DeLuca et al.

[11] Patent Number: 4,649,538

[45] Date of Patent: Mar. 10, 1987

[54] RADIO PAGING DEVICE WITH IMPROVED TEST MODES

[75] Inventors: Michael J. DeLuca, Sunrise; William G. Siegel, Plantation, both of Fla.

[73] Assignee: Motorola, Inc., Schaumburg, Ill.

[21] Appl. No.: 657,425

[22] Filed: Oct. 3, 1984

[51] Int. Cl.⁴ .............................................. H04B 3/46
[52] U.S. Cl. ........................................ 371/25; 371/22; 371/5
[58] Field of Search ............... 371/22, 25, 5, 15; 179/175, 175.31 R; 340/146.1 E, 146.1 C; 375/8, 9, 10; 455/226; 364/514

[56] References Cited

U.S. PATENT DOCUMENTS

| | | | |
|---|---|---|---|
| 3,866,217 | 2/1975 | Bennett | 371/22 |
| 3,916,379 | 10/1975 | Dulaney | 371/22 |
| 4,090,242 | 5/1978 | Lerma et al. | 364/514 |
| 4,200,838 | 4/1980 | Poitovin | 371/22 |
| 4,234,964 | 11/1980 | Cieslak et al. | 455/226 |
| 4,245,352 | 1/1981 | Karpowycz et al. | 455/226 |
| 4,271,478 | 6/1981 | Fink et al. | 364/580 |
| 4,278,850 | 7/1981 | Sato | 371/22 |
| 4,291,403 | 9/1981 | Waddill | 371/5 |
| 4,332,029 | 5/1982 | Campbell et al. | 371/22 |
| 4,414,676 | 11/1983 | Kraul et al. | |
| 4,428,076 | 1/1984 | Schuon | 371/22 |
| 4,580,274 | 4/1986 | Debony | 371/22 |

Primary Examiner—Michael R. Fleming
Attorney, Agent, or Firm—Winfield J. Brown, Jr.; Joseph T. Downey; Anthony B. Sarli

[57] ABSTRACT

A radio paging test system for testing the sensitivity of a radio receiver which receives a group of transmitted signals from a transmitter. Each transmitted signal in the group of transmitted signals is detected ad then compared to a reference signal to determine the degree of similarity between the reference signal and the detected signal. Each detected signal is classified either as a missed page, a non-page or a decoded page depending on the degree of similarity between the detected signal and the reference signal. In one mode of operation the classification of each detected signal is indicated by a classification signal which may be utilized to activate an alert such as a transducer or LED. Each classification signal may be directed to a computer input for analysis. In another mode of operation the classification signals are further analyzed to determine if the pager sensitivity is above, below or at a predetermined level. An alert indicating the pager sensitivity is then generated.

22 Claims, 22 Drawing Figures

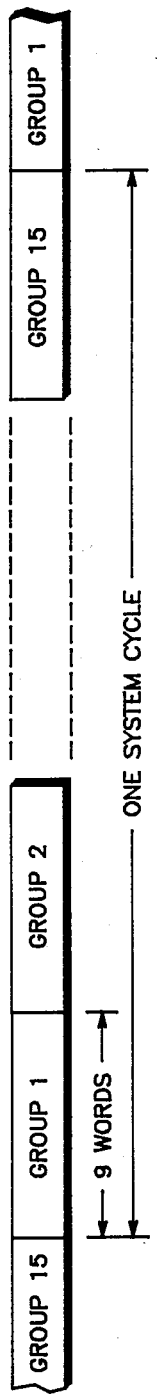
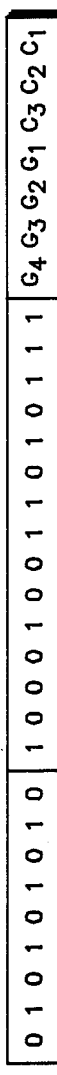
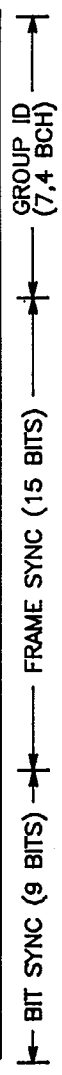
FIG. 1A –PRIOR ART–
FIG. 1B –PRIOR ART–
FIG. 1C –PRIOR ART–
FIG. 1D –PRIOR ART–

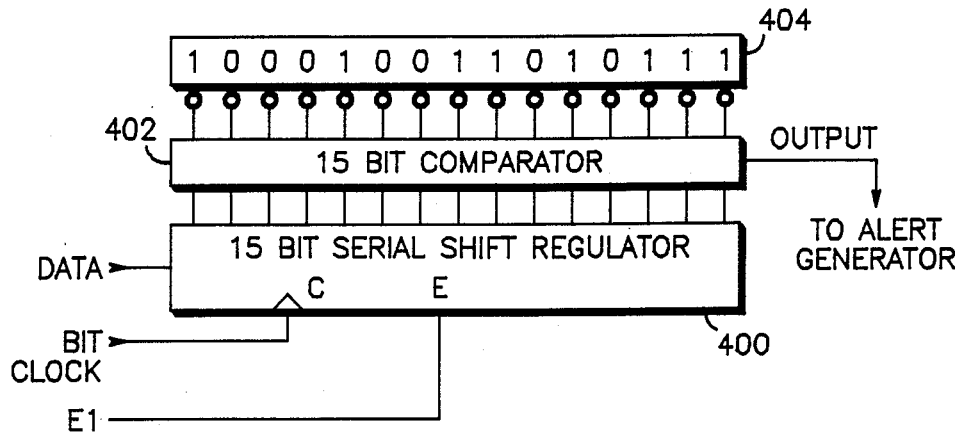
FIG. 7
FIG. 8
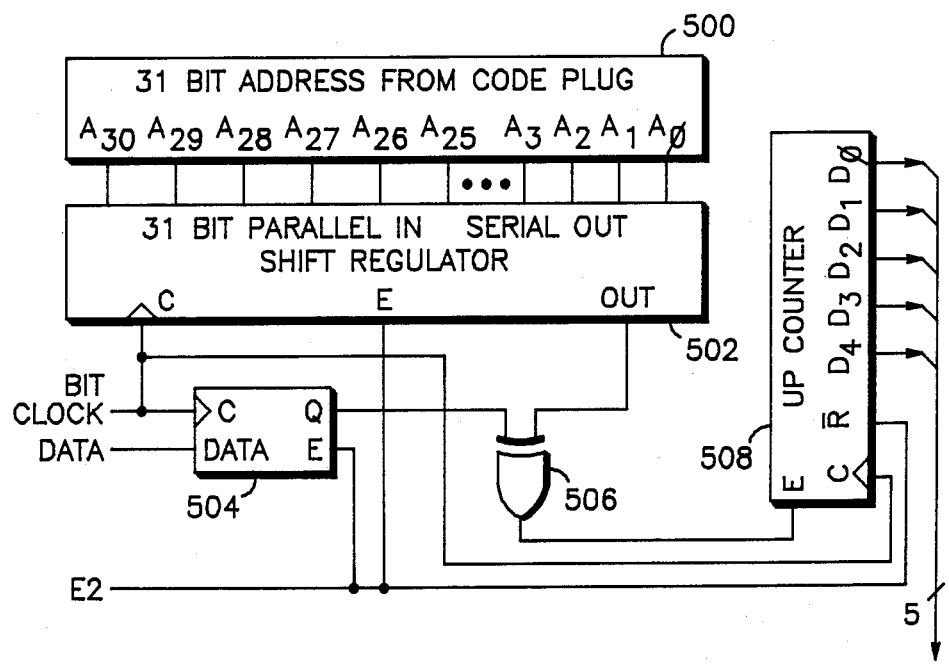

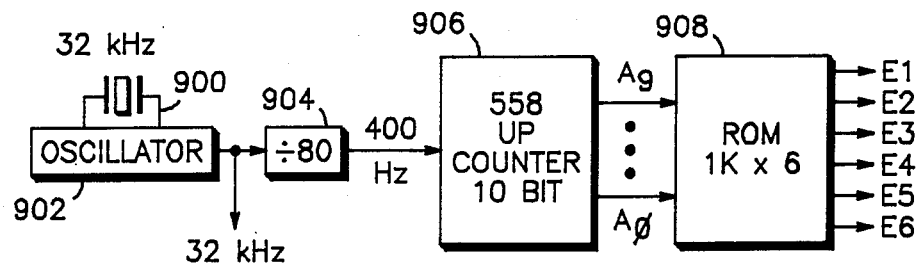
FIG. 12
FIG. 13A
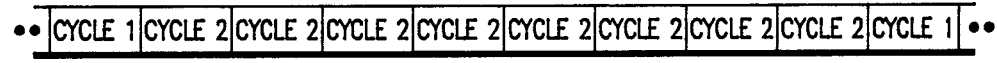

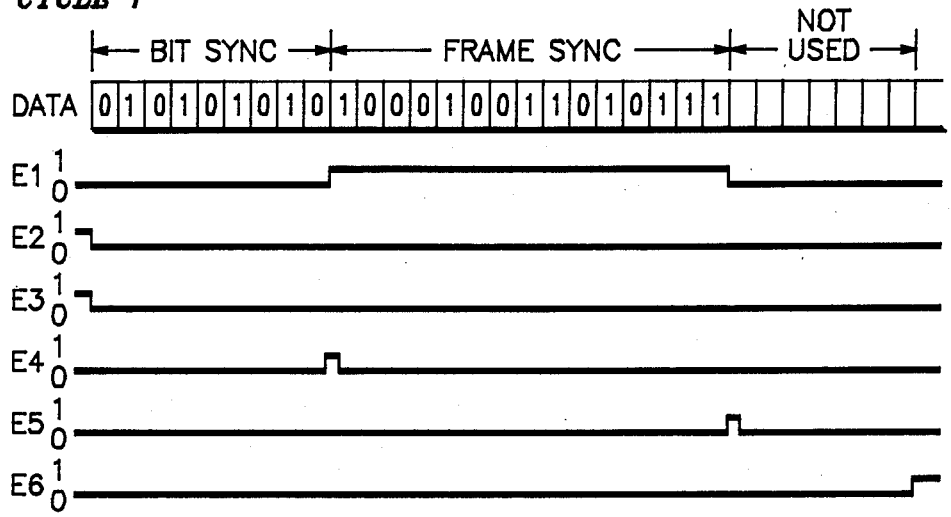
FIG. 13B
FIG. 13C
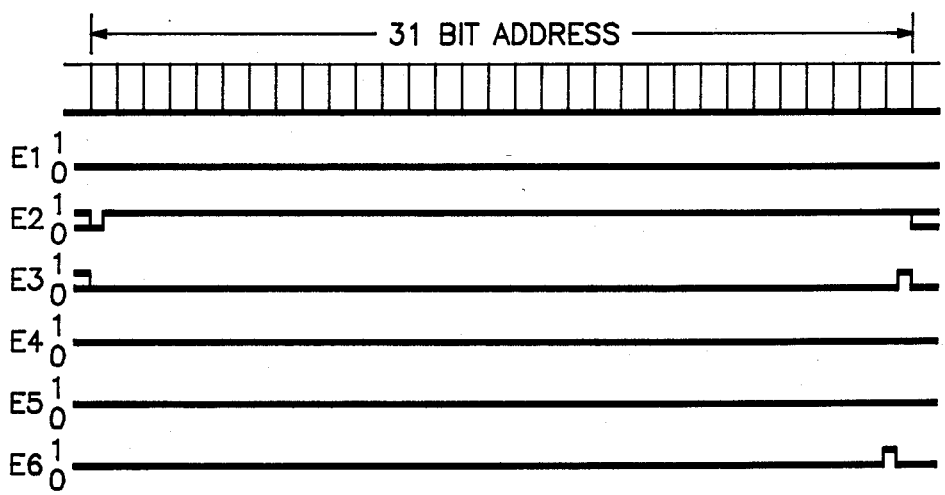

RADIO PAGING DEVICE WITH IMPROVED TEST MODES

BACKGROUND OF THE INVENTION

1. Field of the Invention

The present invention relates to radio receiver devices and decoding methods therefor, and more particularly to a radio receiver having test modes which reduce the time to measure the performance of the device in the production environment.

2. Description of the Prior Art

With the advent of radio receivers for receiving data and microprocessor based decoders, receiver performance testing methods have substantially changed. Presently, in most cases it takes more time to measure the performance of a data receiver than it takes to measure the performance of an equivalent audio receiver in the receiver production environment. Basic reasons for this problem is that digital decoders operate on the same decoding format in production as is used in the field, the field page rate being relatively slow for a selected receiver.

One coding system which utilizes a binary data format is illustrated in FIGS. 1A through 1D. An encoder such as a Motorola Model Z6VEN may be used to generate the aforesaid 15-group, synchronous paging format. With such a system it should be noted that the transmitter is on all the time and would generate a null code if a specific generation of a group and address code is not required. The data is transmitted at predefined times in a fixed data structure at a rate of 200 bits per second. The transmitted data stream is organized into a hierarchy of fields. These fields are: synchronization, group, and address as illustrated in FIGS. 1B, 1C and 1D, respectively.

Referring to FIGS. 1A and 1B it can be seen that the coding format is divided into 15, 9-word groups. The groups occupy fixed positions within the overall data structure and are not necessarily transmitted in a consecutive number sequence; however, each of the 15 groups is transmitted just once every system cycle.

As seen in FIG. 1B, a group consists of one synchronization word and 8 address words. Each word contains 31 bits of information. The format of a synchronization word is different from that of an address.

The synchronization word prefaces each group. Referring to FIG. 1C, this word is assembled from 3 distinct fields, namely: bit sync, frame sync, and group ID. The bit sync field consists of 9 bits of alternating 1's and 0's, starting with a leading 0. This field is used to obtain and maintain decoder synchronization with the incomming data stream. Because of the tight system on relative clock frequency skew, clock acquisition and adjustment consists of phase correction only between the decoder and the transmitter clocks.

Still referring to FIG. 1C the bit sync field is followed by a 15-bit framing field. This field contains a predefined, pseudo-random binary sequence, which is used to define word boundaries within each group. On a long-term basis, it is also used to check the integrity of the recovered data.

The final field comprising the synchronization word is the group ID. This field identifies to which of the 15 possible groups that the next 8 addresses belong. Since the group ID field position is fixed, it functions much like the frame field. During initial synchronization, the group ID field is used to place the decoder into the correct group. It should be noted in this system that the group ID is transmitted once during each system cycle to allow the pager having the associated group code to synchronously sample just 9 consecutive words of the 135-word format to determine if it has been paged. During normal operation the group ID field also is used to check the data integrity period. The group ID is configured as a 7-bit code in a 7, 4 BCH format. No error correction is used.

Following the synchronization words are the 8 address words. Each address word is identical in format, differing only in information content a 31, 16 BCH code being used. Single error correction is permitted. The address data follows this format, unless no information is being sent in an address word. In this case, the 31 bits are replaced with alternating 1's and 0's, which are commonly referred to as the null code.

One radio paging device which responds to the above mentioned coding format is the RC-13B tone-only binary digital radio pager manufactured and sold under the trademark Pocket-Bell TM.

In the "normal" mode (field mode) of operation, the aforesaid pager decodes one page every three system cycles. This is a page rate of one page every 62.775 seconds. In another test mode designated the "20 second" mode the system may decode one page for each system cycle which results in a page rate of one page every 20.925 seconds. Still another test mode designated the "group test" mode requires that the encoder format be modified so that it is always transmitting one group. The pager may decode one page, in every group. This results in a pager decoding rate of one page every 1.395 seconds. Still in another mode designated "S" mode the decoder of the paging device ignores the group identification information in a synchronization word and may decode one page in every group. This also results in a pager decoder rate of one page in every 1.395 seconds. Thus, the radio paging device may only decode and alert pages every 1.395 seconds. Thus, the standard 20 page production sensitivity measurement testing would take 27.9 seconds. This is because the decoder operation only allows the decoder to decode and alert the status of one of the eight addresses in the 1.395 second group.

SUMMARY OF THE INVENTION

Accordingly, one object of the present invention is to provide a radio receiving device which has an improved test mode which reduces the amount of time necessary to test the sensitivity of the radio receiving device.

It is yet another object of the present invention to provide a radio receiver device employing a novel method of testing the sensitivity of the device.

It is still another object of the present invention to provide a novel radio receiver device having an improved test mode for increasing the accuracy of the receiver performance measurement by allowing a much larger sample size of decoded pages in a given time frame.

It is yet still another object of the present invention to provide a novel method of testing a radio receiver which increases the accuracy of the receiver peformance measurements by allowing a much larger sample size of decoded pages in a given time frame.

The above and other objects and advantages of the present invention are provided by a radio receiving device responsive to a synchronous selective call signal having a quick sensitivity (QS) mode of testing. When in the QS mode the radio receiving device decodes each address in a group of addresses. The number of bit errors are counted for each address to determine if an appropriate address was received, or if an appropriate address was missed, or if the address was not intended for the particular radio receiving device. There are two types of alerting capabilities for the QS mode; namely, the QS1 alert which is intended for use on the bench and in field testing and the QS2 alert which is intended for use in the production environment with a test station computer monitoring the radio receiver alerts. In the QS1 alert mode the number of "decoded" and "missed" pages are counted and when the sum of these two types of pages reach a predetermined value a QS1 alert is generated. The frequency of the alert is determined by the number of "decoded" addresses intended for the receiver. The operator then can adjust the RF power level of the receiver until it generates the proper QS1 alert frequency. The QS2 alert on the other hand, is capable of generating an alert after each address has been decoded. If the decoded address is intended for the receiver and there is only one or less bit errors an alert is generated for a first duration; if the decoded address is intended for the receiver but there are 2 to 5 bit errors, an alert is generated for a second duration; and if the decoded address is not intended for the receiver, that is there are 6 or more bit errors, an alert is generated having a third duration. Also, if Bit sync is missed a signal is generated for a predetermined duration and if Frame sync is missed a signal is generated for a different duration.

Thus, this invention changes the decoder operation and allows the decoder to decode and alert all eight of the addresses in a 1.395 second group. Thus, the decoder may decode and alert eight times faster than prior art decoders. This reduces the time required to make a standard twenty page sensitivity measurement from 27.9 seconds to an average of 3.48 seconds. Since the standard twenty page sensitivity measurement is used many times in the pager production process, this invention substantially reduces the time required to test the pager in the production environment.

BRIEF DESCRIPTION OF THE DRAWINGS

FIGS. 1A-1D illustrates a prior art synchronous encoding scheme;

FIG. 7 is a detailed schematic diagram of the frame synchronizer of FIG. 6.

FIG. 8 is a detailed schematic diagram of the address detector of FIG. 6.

FIG. 12 is a detailed schematic diagram of the master synchronizer of FIG. 6.

FIGS. 13A, B and C represent timing charts for the enable signals generated by the master synchronizer of FIG. 12.

DESCRIPTION OF THE PREFERRED EMBODIMENTS

Figure 2:
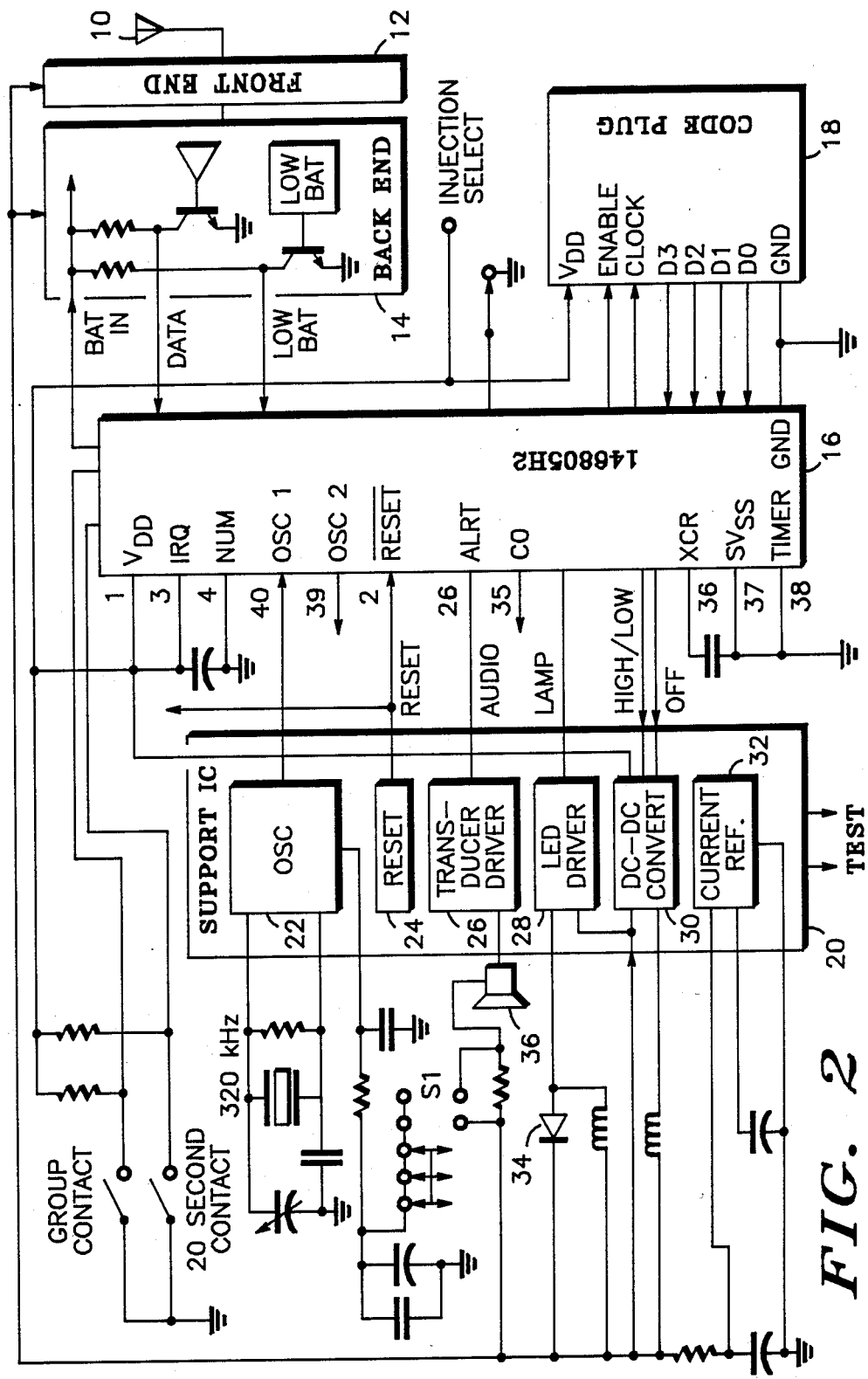
FIG. 2 is a block diagram of the decoding system of the present invention.

Referring now to the drawings, wherein like reference numerals designate identical or corresponding parts throughout the several views, and more particularly to FIG. 2, thereof a block diagram of the hardware and firmware system for performing the decoding function in a radio paging device is illustrated. The system includes an antenna 10 for directing a modulated RF signal to a radio receiver front end 12 and backend 14 which converts the RF signals into a stream of binary data signals by circuitry and techniques well known to those skilled in the art. The binary data signals are directed to a microcomputer 16 such as a model No. 146805H2 manufactured by Motorola which executes the decoding routine, including determining when the radio paging device is being addressed. At least one address for the radio paging device is stored in the code plug 18 which may be a ROM or PROM. The support chip 20 includes circuitry well known to those skilled in the art such as an oscillator 22, reset circuit 24, transducer driver 26, LED driver 28, DC to DC converter 30, and current reference circuit 32. The LED driver 28 drives the LED 34, while the transducer driver 26 drives the transducer 36.

The operation of the above system will be explained immediately hereinafter. Upon application of power to the radio paging device, the microcomputer 16 is initialized. This is followed by a program command by the microcomputer 16 to apply power to the receiver circuitry (i.e. front end 12 and backend 14); a turn-on alert tone is heard signifying a good battery condition. Resetting of the alert tone sequences the program to the next step—code plug read-in.

Next, the microcomputer 16 checks and stores the logic state of the appropriate injection select input to determine the polarity of the incoming recovered data. This is followed by a read-in of the 20-second call and the group call mode switches. These two lines are used to decode all four paging modes as well as the quick sensitivity mode. An internal flag is set in the microcomputer 16 as an indication of which mode was selected. Assuming that the normal paging mode was decoded on the mode contacts and that none of the mode slection code plug bits were programmed, the pager starts to decode in the normal mode. The recovered data stream is then examined to acquire bit synchronization in accordance with the technique explained in U.S. Pat. No. 4,414,676 to Kraul et al. entitled Signal Synchronization System which is hereby incorporated by reference herein. If it is not found within 2.8 seconds (18 words), a command is issued to power down (i.e., switch to battery-saver), and repeat the turn-on cycle in 18 seconds (117 words). If bit synchronization is acquired (i.e., the decoder clock is phase-locked with the transmitter clock), the program proceeds to search for, and find, the frame synchronization pattern of 15 unique bits. The process is repeated again, but this time over a 137 word span; if an error is found, the program will loop back to the turn-on cycle; otherwise, it will proceed ahead.

Once frame sync has been found, the microcomputer 16 looks for the pager's group ID by comparing the incoming 7-bit group ID with that which was read from the code plug. Now the microcomputer 16 searches for, and stores, any pager addresses contained in the 8-word sequence immediately following the decoded group ID. This portion of the program provides falsing protection. Since the group ID has been decoded only once, it is not considered fully validated. It is possible that two pagers exist with the same pager ID, but different group IDs. By storing this group of addresses and not sounding any immediate alert until the group ID has been found a second time, invalid alerts are minimized.

After finding the group ID once, the program validates this data by finding it a second time within the next 210 seconds. Battery saving is used during this search process. At this point, master synchronization has been obtained.

The microcomputer 16 continues to synchronously sample the transmitted data, once every 15 groups, looking for bit sync, frame sync, and pager ID. Small phase corrections are made, as necessary, to the local clock, as well as data skewing corrections of plus or minus 1 bit to the frame sync. If A or B address correlation is found, the appropriate alert tone is sounded.

Provisions are included in the program to decode and sequentially process an A and a B pager ID within the same subscriber group field. For example, if after recognizing group ID, address word 3 contains the address A code and address word 5 contains the address B code, the following sequence of events will occur. The microcomputer 16 will decode both addresses and immediately issue a command to sound the A alert tone. Within about one second of resetting the A alert, the microcomputer 16 will issue a second command to sound the B alert tone. Thus, both pages are accepted, decoded, stored, and sequentially sounded to alert the user of each page.

An additional feature of the normal paging mode program concerns paging lockout. In the normal paging mode, the microcomputer 16 permits only one of three consecutive subscriber group pages for a particular address (A or B) to be accepted. That is, if an A-address page is decoded and acknowledged, the two subsequent A-address pages are ignored. The same lockout feature also applies to B address pages. However, the lockout feature is not interactive between addresses; that is, acknowledgement of an A-address page does not lockout subsequent B-address pages or vice-versa.

Except for the elimination of the paging lockout feature, the program routine for the 20-second call mode is essentially as described for the normal paging mode.

Major program differences for the group call paging mode include elimination of the paging lockout function, removal of the battery-saver feature and automatic resetting of the alert tone.

In the group call mode, the appropriate alert tone will sound at the end of the address word containing the pager ID. It is automatically silenced at the beginning of the next sync word.

The S-mode program routine is essentially the same as the group call, except that the requirement for group ID correlation is eliminated.

The pager is comprised of two basic sections, a receiver and a decoder. The receiver comprised of the front end 12 and backend 14 processes an RF modulated signal and presents the decoder with recovered data. The functions of the receiver are well known to those skilled in the art. The decoder is comprised of three integrated circuits, a microcomputer 16, a support chip 20 and a code plug 18. The pager also has a battery, switch, transducer 36, LED 34 and test contacts. The decoder and receiver interface with three lines. A battery save line signals the receiver to switch ON and OFF in a manner to conserve battery power when it is not necessary to receive and decode data. When the receiver is ON a data line present the decoder with RF demodulated data. Also, while the receiver is ON, a low battery line supplies the decoder with battery status information.

Figure 3:
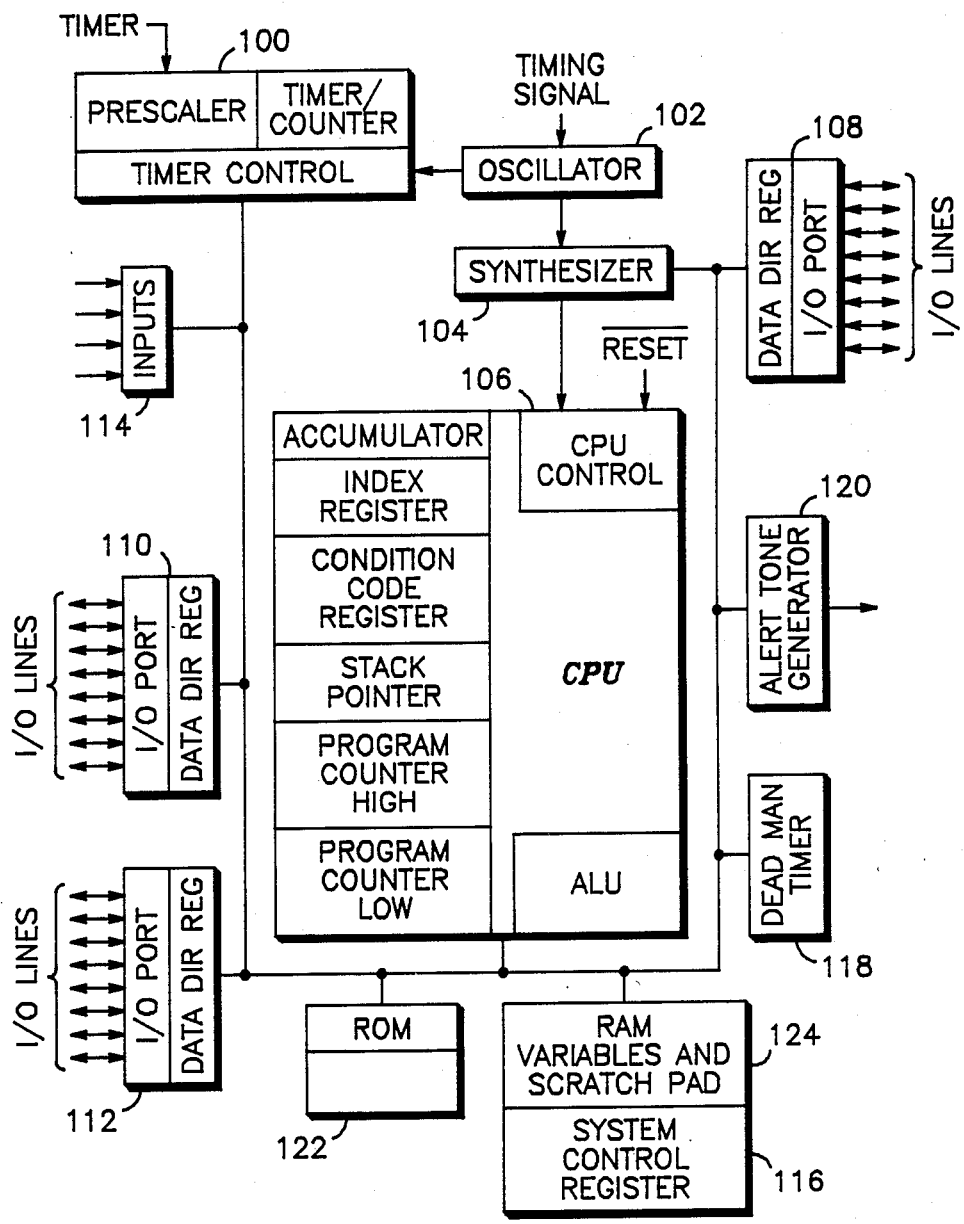
FIG. 3 is a block diagram of a microcomputer containing firmware program for the one embodiment of the present invention.

The microcomputer 16 is the main system controller and FIG. 3 shows a combination functional and schematic block diagram thereof. A timer signal for actuation is supplied to a timer control unit 100 containing a prescaler and a timer and counter. A 32.0 kHz square wave timing signal is coupled to oscillator circuit 102 which is also connected to timer control and a frequency synthesizer 104. The timer control circuit controls the various operations of the microcomputer. The synthesizer 104, under program control will provide the processor with a synthesized bus frequency of 128 kHz or unsynthesized bus frequency of 16 kHz for additional power saving.

Synthesizer 104 is also connected to central processing unit 106 which contains the central processing unit control circuit, an arithmetic logic unit designated ALU, an accumulator, index register, condition code register, stack pointer, program counter high and program counter low modules. Also connected to the central processing unit are data directional input/output registers 108, 110 and 112 having a plurality of input/output lines. In particular, eight lines are shown for each of three data direction registers. Also, there is an input only register, 114, allowing four input only signals. The system control 116 register provides control of the deadman timer 118, alert tone generator 120, and synthesizer 109. Also interfacing with the central processing unit are a read-only memory (ROM) 122 and a random access memory (RAM) 124. As is characteristic of the Motorola 146805H2 family the on chip RAM permits the microcomputer to operate without an external memory. The parallel input/output capability includes programmable pins indicating whether it is to be an input or an output. The timer/counter is normally an eight bit counter with a programmable prescaler which can be used as an event counter to generate interrupt signals at certain software-selected events or can be used for timing keeping. In the case of the Motorola CMOS version MCM146805H2, this timer can be set to wake-up the microprocessor from a software actuated command to establish a power saving wait mode.

The deadman timer 118 will reset the program flow if not signaled on a periodic basis by the software. The alert tone generator is capable of generating a 5333 Hz, 2667 Hz and 1333 Hz frequency under software control.

Under program control the microcomputer 16 interfaces with the support chip 20. The support chip 20 is comprised of an oscillator 22, reset circuit 24, transducer driver 26, LED driver 28, DC-DC converter 30 and internal reference circuits 32. The reference circuit 32 provides proper currents and voltages to the remainder of the circuit. The DC-DC converter 30 steps up the battery voltage to a level that will operate the CMOS microcomputer and the LED. There are two control lines from the microcomputer allowing selection of three current output levels. Reducing the maximum output current level of the DC-DC converter increases battery life. The LED driver 28, when signaled by the microcomputer 16 will provide a current sink, turning the LED ON. The LED will remain ON for the duration of the signal from the microcomputer 16. The transducer driver 26, when signaled by the microcomputer's tone generator will provide a current sink for the transducer 16 at a frequency provided by the tone generator. This causes the transducer 36 to generate a tone at a frequency equal to that of the microcomputer's tone generator. The reset circuit 24 provides a rest signal to the microcomputer 16 when either battery power has been switched on by the ON/OFF switch or when B++ is below a predetermined voltage. The reset signal allows the microcomputer to properly reinitialize itself for proper operation. The oscillator circuit along with a 32.0 kHz crystal, generates a 32.0 kHz square wave for the microcomputer clock.

The code plug 18 contains constants necessary for operation of the microcomputer. These constants include a status word, two addresses, a group ID and quick sensitivity variables. After the code plug 18 is enabled by the microcomputer 16, the microcomputer 16 clocks the contents out of the code plug 18 four bits at a time. The bits occur on data lines D∅-D3 each time the code plug is clocked. The code plug 18 contains 13 bytes of information and must be clocked 26 times to output al of the information. The structure of the code plug on a byte basis is:

BYTE 0: STATUS

B0: Programmed, this bit should always be programmed.

B1: Unprogrammed, this bit should remain unprogrammed.

B2: Dead Man Reset

Not programmed for field use. If this bit is programmed and a dead-man reset occurs, a 1333 Hz tone will be sounded until reset by the alert reset switch.

B3: Silent

Not programmed for normal field use. If this bit is programmed the page will not enter the silent mode.

B4: S

Not programmed for normal field use. The pager will operate in the S mode if this bit is programmed and the mode contacts are set for normal mode and the 20 Second bit is not programmed.

B5: 20 Second

Not programmed for field use. The pager will operate in the 20 Second mode if this bit is programmed and the mode contacts are in the normal mode.

B6: Valid Quick Sensitivity (VQS)

Not programmed for field use. Programming this bit makes the pager run in the QS mode all of the time. It is possible to run QS in the four specified decode modes. The address decoded for QS is codeplug selectable. Bit and frame synce error information becomes avilablle on the Group contact.

B7: Valid Codeplug

Always programmed in normal field use. If there is valid information in the codeplug, this bit must be programmed.

| | BYTE 1–4: Address A | | | | | | |
|---|---|---|---|---|---|---|---|
| | BIT IN BYTE | | | | | | |
| BYTE | B7 | B6 | B5 | B4 | B3 | B2 | B1 | B0 |
| 2 | A7 | A6 | A5 | A4 | A3 | A2 | A1 | A0 |
| 3 | A15 | A14 | A13 | A12 | A11 | A10 | A9 | A8 |
| 4 | P7 | P6 | P5 | P4 | P3 | P2 | P1 | P0 |
| 5 | P14 | P13 | P12 | P11 | P10 | P9 | P8 | VADA |

The Valid Address Bit A(VADA) must always be programmed if Address A is valid.

| | BYTE 5–8: Address B | | | | | | |
|---|---|---|---|---|---|---|---|
| | BIT IN BYTE | | | | | | |
| BYTE | B7 | B6 | B5 | B4 | B3 | B2 | B1 | B0 |
| 6 | A7 | A6 | A5 | A4 | A3 | A2 | A1 | A0 |
| 7 | A15 | A14 | A13 | A12 | A11 | A10 | A9 | A8 |
| 8 | P7 | P6 | P5 | P4 | P3 | P2 | P1 | P0 |
| 9 | P14 | P13 | P12 | P11 | P10 | P9 | P8 | VADB |

The Valid Address Bit B(VADB) must always be programmed if Address B is valid.

| BYTE 9: GROUP | | | | | | | |
|---|---|---|---|---|---|---|---|
| BIT IN BYTE | | | | | | | |
| B7 | B6 | B5 | B4 | B3 | B2 | B1 | B0 |
| * | G3 | G2 | G1 | G0 | P2 | P1 | P0 |

* = unprogrammed

BYTES 10–12: Program Variables

These bytes are normally unprogrammed, however they may be programmed if changes are desired in constants used in the software. If any byte is programmed, they must all be programmed.

Byte 10: QSSIZE determines the page sample size for a QS1 alert (20)

Byte 11: QSHIGH determines max number of decoded pages for threshold sensitivity (18)

Byte 12: QSLOW determines min number of decoded pages for threshold sensitivity (17).

The decoder also contains 2 mode contacts, 20 second and Group. These contacts are used to determine the mode of decoding after a power-on reset. While decoding, the contacts output alert status information.

With the preceding explanation of the operation of the pager system of FIG. 2 and the decoding system of FIG. 3 complete, the quick sensitivity (QS) modes of operation will now be explained.

The QS mode may be operational in all four of the aforementioned decoding modes. It can decode 8 times faster in the "20 second", "Group" and "S" modes. In the "normal" mode the page rate is increased 24 times yielding the same page rate as in the "20 second" mode. The basic limitation of the non-QS modes is that the decoder is allowed to decode only one of the eight addresses in a group of addresses. The QS mode allows the decoder to decode and alert all eight addresses in the group. The maximum page rate is reached when all eight addresses in the group are filled with a particular pager's addresses. In this embodiment, the pager has two address decode capability, either or both of the two pager addresses being decoded while in the QS mode (as in the four non-QS modes).

All four of the non-QS modes operate on a group of eight addresses. The QS mode operates within the group of eight addresses which provides for operation in all four non-QS modes. In the QS mode it is necessary for the decoder to distinguish a decoded page from a missed page and from a non-page. This is accomplished by counting the number of bit errors in each 31 bit address received. These types of pages are defined as follows:

| Decoded Page | 0 <=bit errors <= 1 |
| Missed Page | 2 <=bit errors <= 5 |
| Non Page | 6 <=bit errors <= 31 |

In the non-QS modes, no distinction is made between missed pages and non-pages. The missed page is included in the QS mode to allow any number of pager addresses to be placed in a group. The decoder can then distinguish between a page intended for the pager and not decoded (missed because of excessive bit errors) from a page not intended for the pager. Five bit errors was chosen as the limit for the missed page because it is also the hamming distance for the 31/16 BCH address. Since the QS mode is a test mode, the probability and consequence of a false decode of a missed page is very small.

There are two types of pager alerts in the QS mode. The first type of alert (QS1) is an alert intended for use on the bench and in field testing. The second type (QS2) is intended for use in the production environment with a test station computer monitoring the pager alerts. The reason for two types of alerts is that the QS mode pager is capable of supplying data at 0.155 second intervals. This data rate is acceptable for computer monitoring, but is too fast for a human operator to record. The first description will be of the QS2 alert algorithm since the QS1 alert algorithm operates on information generated by the QS2 alert algorithm.

The QS2 alert algorithm generates three separate contact pulse durations, tone durations and/or lamp flash durations. The pulse, tone and flash alerts occur in unison. The QS2 alert is generated when the pager is in the QS2 mode and the decoder has achieved master synchronization to the transmitted data. The QS2 alert cycle lasts 0.155 sec (one 31 bit address) and has three separate durations for the three types of pages. For a received page the alert duration is 0.135 seconds; for a missed page the alert duration is 0.045 seconds; and for a non-page the alert duration is 0.005 seconds. The alert is generated for each decoded page. The alert starts immediately after the 31st bit of the page and alerts during the next address. In the case of a page in the 8th order address, the alert is generated during the first address of the next pager group. The QS2 page alerts are not generated during the synchronization word nor in the battery save mode. The contact pulse, LED flash and 2667 Hz tone are generated when the pager is in the normal alert silent alert mode. When the pager is in the silent alert mode, only the contact pulse and the LED flash are generated.

A second signal type in both the QS1 and QS2 modes indicates that the decoder received bit errors in either Bit Sync or Frame Sync. If bit sync is missed, a 0.075 second pulse is generated and if frame sync is missed a 0.035 second pulse is generated. If both are missed, the pulse duration will be 0.110 seconds. Either or both of the two pulses will be generated immediately after Bit or Frame Sync, respectively, in the synchronization word. These pulses appear on the group mode contact and are generated in both of the QS modes only if the VQS bit i.s programmed in the code-plug.

The QS1 alert uses the information generated by the QS2 alert algorithm to generate an alert that is more readily usable during both bench and field testing. During the QS1 alert mode the "decoded" and "missed" pages are counted by the decoder ("non" pages are not counted), and when the sum of these types of pages reach a predetermined value (QS SIZE), a QS2 alert is generated. The frequency of the QS2 alert depends on the number of decoded pages. If the number of decoded pages is greater than a second predetermined value (QS HIGH), a 5333 Hz tone is generated. If the number of decoded pages is less than a third predetermined value (QS LOW), a 1333 Hz tone is generated. If the number of decoded pages is equal to or between the second and third (QS HIGH & QS LOW) values, a 2667 Hz tone is generated representing threshold sensitivity. The duration of the tone is 0.135 sec and is accompanied by an LED flash. Note that decoding of addresses does not take place during a QS1 alert, thus eliminating errors caused by receiver interference generated by the transducer. The three variables; QS SIZE, QS HIGH and QS LOW are code plug programmable and have maximum values of 255. When the values are unprogrammed, the default values are QS SIZE =20, QS HIGH =18 and QS LOW =17. Below is a listing of the various alert frequencies:

| # OF PAGES DECODED (QS SIZE = 20) | QS1 ALERT FREQUENCY |
|---|---|
| 20 | 5333 Hz |
| 19 | 5333 Hz |
| 18 | 2667 Hz |
| 17 | 2667 Hz |
| 16 | 1333 Hz |
| 15 | 1333 Hz |
| " | " |
| 0 | 1333 Hz |

A simplified explanation for the operator is to adjust the RF power level so that the pager generates a 2667 Hz QS1 alert. A 2667 Hz alert indicates that the paging sensitivity threshold has been reached. If the frequency is high (5333 Hz) then the RF power is high and should be reduced. If the frequency is low (1333 Hz) then the RF power is low and should be increased. At the maximum page rate, eight pages per group, a QS1 alert is generated every 3.49 sec. with a 20 page sample.

There are two ways to enter the QS mode. The first is to close the proper pager contacts immediately after a power-on alert reset. The second is to program the QS bit in the codeplug. Table 1 describes all the possible pager decode modes and QS combinations that can be obtained. After the power on alert is reset, the QS mode is latched. Once a pager is latched in a QS mode it will remain in the QS mode until it is turned OFF. The QS mode can only be latched after a power ON alert reset.

The paging device which uses the QS mode also has a silent mode operation. The silent mode in non-QS modes will flash the LED and not sound the transducer, while the normal alert mode sounds the transducer and flashes the LED in unison. The silent mode is entered during the power on alert sequence. To enter the silent mode, the power on alert must be manually reset (alert reset button pressed before the fifth beep is finished). The alert reset switch must continue to be pressed for 1.5 seconds minimum. After that time a silent mode entry alert is generated confirming that the silent mode has been entered. The mode selection truth table is shown in Table 1.

consists of the standard default addresses OEOD and 0605. The third set consists of null code, two addresses that consist of a dotting pattern (alternating ones and zeros, with A the inverse of B). The null code addresses will probably be most useful in the QS mode because it equals the encoder's data output when there are no other addresses being outputted. The decoder can decode eight adresses per group when decoding null code without modification to existing encoders. Since the addresses to be decoded in the QS mode are a function of the code plug, it can be decoded (See Table 1).

Figure 4A:
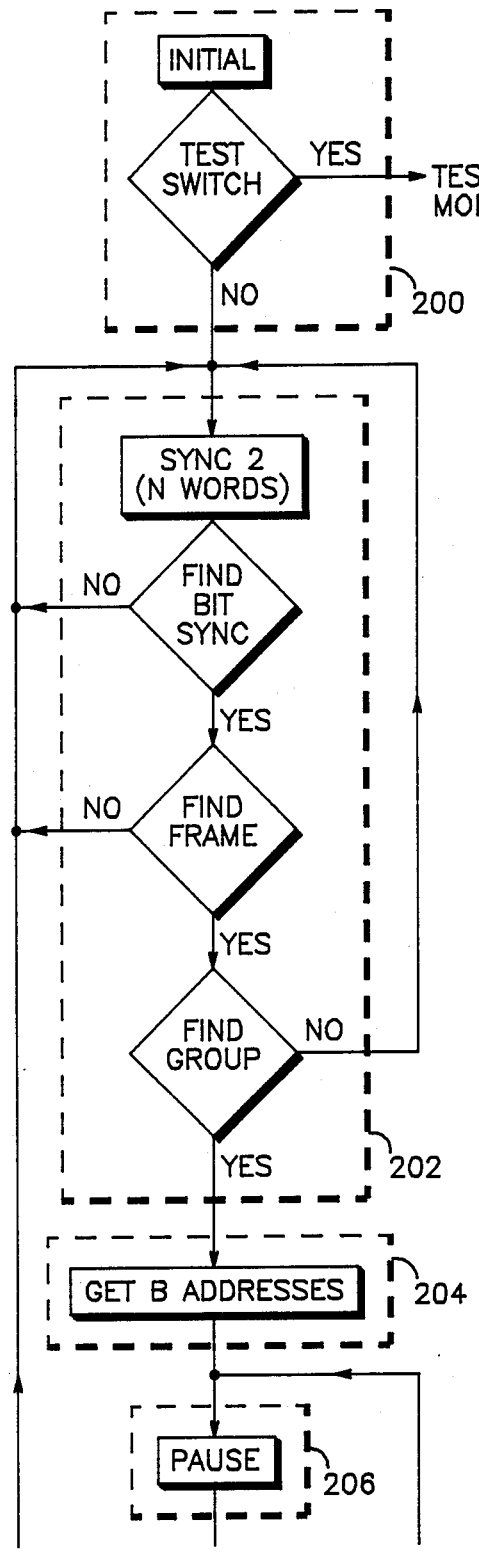
FIGS. 4A and 4B represent flow chart illustrating the overall operation of the QS mode for the microcomputer 30 of FIG. 2.
Figure 4B:
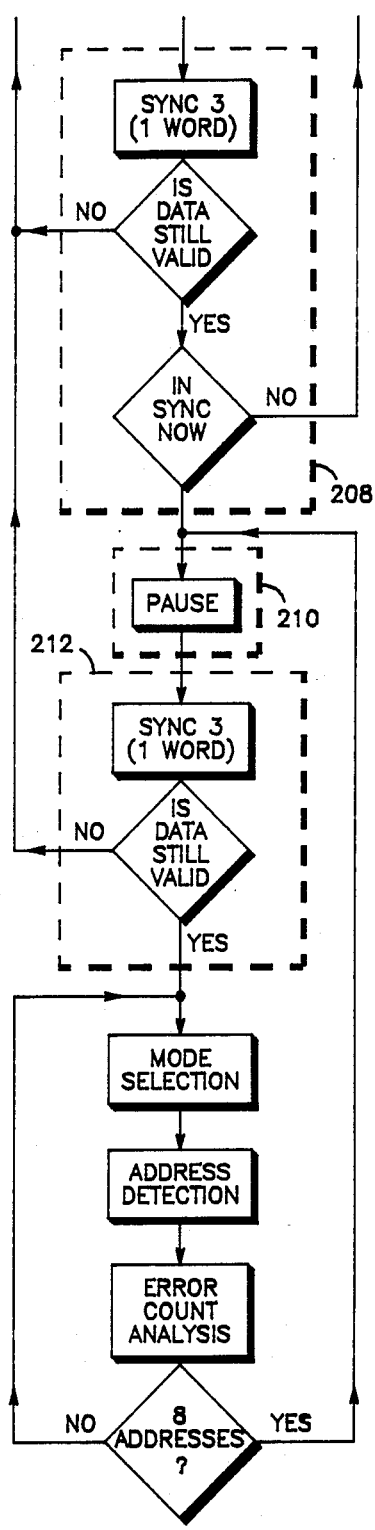

FIGS. 4A and 4B show a flowchart of the operational program to decode a communication coding system

TABLE 1

MODE SELECTION TRUTH TABLE

| MODE CONTACTS 0=open 1=close | | CODEPLUG STATUS BITS X=don't care 0=unprogrammed 1=programmed | | | | RESULTS latched after power on alert reset | | |
|---|---|---|---|---|---|---|---|---|
| 20S | GRP | VQS | 20S | S | VCP | QS | DECODE MODE | DECODE ADDRESS* |
| 0 | 0 | 0 | 0 | 0 | 0 | N | Normal | vanilla |
| 0 | 0 | 0 | 0 | 0 | 1 | N | Normal | codeplug |
| 0 | 0 | 0 | 0 | 1 | 0 | N | S | vanilla |
| 0 | 0 | 0 | 0 | 1 | 1 | N | S | codeplug |
| 0 | 0 | 0 | 1 | X | 0 | N | 20 Second | vanilla |
| 0 | 0 | 0 | 1 | X | 1 | N | 20 Second | codeplug |
| 0 | 0 | 1 | 0 | 0 | 0 | Y | Normal | vanilla |
| 0 | 0 | 1 | 0 | 0 | 1 | Y | Normal | codeplug |
| 0 | 0 | 1 | 0 | 1 | 0 | Y | S | vanilla |
| 0 | 0 | 1 | 0 | 1 | 1 | Y | S | codeplug |
| 0 | 0 | 1 | 1 | X | 0 | Y | 20 Second | vanilla |
| 0 | 0 | 1 | 1 | X | 1 | Y | 20 Second | codeplug |
| 0 | 1 | 0 | X | X | 0 | N | Group | vanilla |
| 0 | 1 | 0 | X | X | 1 | N | Group | codeplug |
| 0 | 1 | 1 | X | X | 0 | Y | Group | vanilla |
| 0 | 1 | 1 | X | X | 1 | Y | Group | codeplug |
| 1 | 0 | 0 | X | X | 0 | N | 20 Second | vanilla |
| 1 | 0 | 0 | X | X | 1 | N | 20 Second | codeplug |
| 1 | 0 | 1 | X | X | 0 | Y | 20 Second | vanilla |
| 1 | 0 | 1 | X | X | 1 | Y | 20 Second | codeplug |
| 1 | 1 | 0 | X | X | X | Y | S | null |
| 1 | 1 | 1 | X | X | 0 | Y | S | vanilla |
| 1 | 1 | 1 | X | X | 1 | Y | S | codeplug |

*vanilla address; A = $0E0D+parity, B =0 $0605+parity codeplug address = contents programmed into codeplug null address; A = $2AAAAAAA, B = $55555555

The QS Alerts for the four combinations of QS1, QS2, Silent and Normal Alerts are illustrated in Tables 2 and 3 below.

TABLE 2

QUICK SENSITIVITY ALERTS

| 20S CONTACT 0=open 1=close | SILENT MODE 0=disable 1=enabled | AUDIO SIGNAL | LAMP SIGNAL | 20S CONTACT SIGNAL |
|---|---|---|---|---|
| 0 | 0 | OFF | QS2 | QS2 |
| 0 | 1 | QS2 | QS2 | QS2 |
| 1 | X | QS1 | QS2+QS1 | OFF |

X=don't care

TABLE 3

BAD BIT AND FRAME ALERTS

| VQS BIT IN CODEPLUG 0=unprogrammed 1=programmed | GROUP CONTACTS SIGNAL |
|---|---|
| 0 | OFF |
| 1 | bad bit and/or frame signal |

When operating in the QS mode, it is possible to have the code plug select one of three possible sets of addresses to be used in the QS mode. The first set contains the addresses stored in the code plug. The second set shown in FIG. 1. A program module INITIAL enclosed with a broken line an designated 200 includes a decision block interrogating a test switch normally not accessible to the user. The setting of the test switch results in a test mode which is not necessary to the description of the present invention. During initialization, a 3.1 second power up alert is generated. The user may select the silent mode of operation by holding the alert reset switch closed for 1.5 seconds during the power-up alert. After the alert is reset two mode contacts are read and the code plug information is read. Table 1 indicates the decoder operating mode as a combination of the mode selectors and the codeplug status word. The decoder can operate in the four decode modes, Normal, 20 second, Group and S; with or without QS (Quick sensitivity) activated and can decode several address types as outlined by Table 1. The non-QS alert modes have no bearing on this invention and will not be described here.

If the test switch has not been set and the QS mode has been selected, a program module SYNC 2 enclosed by a broken line and designated 202 operates for a period of N words to find bit synchronization, frame positions and group identification. N may be chosen with respect to the message scheme code shown in FIG. 1 to find and identify frame positions (word delineators) and group positions (nine word delineators) with some desired confidence level. Any negative answer from the decision blocks of module 202 causes a return to the entry point of SYNC 2 module 200.

The affirmative FIND GROUP line from SYNC 2 module 202 accesses a GET 8 ADDRESSES module 204 which operates to interrogate the memory locations where the one or more code plug addresses has been stored. It should be noted that the group ID is always found if decoding in the "S" mode. It interrogates eight addresses contained in each group segment to determine if a page has been detected. The results are ignored for the QS mode.

GET 8 ADDRESSES Module 204 accesses a pause module 206. PAUSE denotes a suspension of decoding and processing incoming signals for some timed period. Thus, the first time there is an attempt to detect a page and before any detect can be confirmed, the system assumes a PAUSE configuration for one complete message cycle and returns at the same relative position in the approximately 21 second message cycle. If the decoder is in the group or S modes there is no pause.

After the PAUSE Operation, control is transferred to a SYNC 3 program module enclosed by a broken line and designated 208. SYNC 3 interrogates one word of information comprising eight bits of the synchronization word and determines if this corresponds to the predesignated repetitive $\emptyset 1$ pattern. The data is listed to determine if it is still valid and currently in synchronization. DATA STILL VALID is a procedural test to insure that long term integrity of the data has been maintained to some desired confidence level. A negative determination transfers control back to the entry point of SYNC 2 module 202. IN SYNC NOW Is a procedural test to check the positions of selected fields in the data system. A negative determination transfers control back to PAUSE module 206.

After the suitable time period, in the "normal" and "20 Second" decode modes, the PAUSE Module 210 transfers control to SYNC 3 module 212 which establishes synchronization of the eight bits in the synchronization word and determines whether the data is still valid. The inclusion of SYNC 3 at this point in the flowchart is to confirm that the paging device has remained in synchronization after the pause operation. This SYNC 3 module also enables the QS alert status of bit and frame synchronization if selected by the call plug VQS bit. A negative determination from DATA STILL VALID causes transfer to the entry point of SYNC 2 module 202 in FIG. 4A. The synchronization subroutine is explained in more detail hereinafter when referring to FIG. 5A. Once the synchronization routine has been executed the program proceeds to the mode selection routine decision for QS mode where the decoder operation mode depends upon the mode selected. A determination is made as to whether the QS1 alert mode is enabled or the QS2 alert mode is enabled as well as whether the paging device is in the silent mode or not. Referring to FIG. 4B, once the desired mode of operation is determined, the program progresses to the address decoding routine where address decoding begins. In this embodiment, two different addresses may be detected by the paging device. In this routine incoming address data is compared with the two decoder addresses which have been predetermined from table 1. After the address is read in and compared with the addresses from the code plug an error count equal to the number of mismatched bits is generated. A more detailed explanation of the address decoding subroutine will be explained in FIG. 5C hereinafter. Once the address decoding subroutine is completed the program proceeds to the error count analysis subroutine where error count analysis is performed. In this subroutine the error counts from the address decoding subroutine are analized to determine the status of received address, i.e. non-page missed page or decoded page. The alert bit timer is initialized for a QS2 alert duration and counters for the ratio counter are handled. A more detailed explanation of this subroutine will be provided when referring to FIG. 5D hereinafter.

Once the error count analysis subroutine is completed the decision is made as to whether all the addresses within a group have been decoded. If not all the addresses within the group have been decoded the program returns to the operational mode selection subroutine for further processing. On the other hand if all the addresses within the group have been decoded, the program returns to the pause routine 210, FIG. 4B.

Figure 5A:
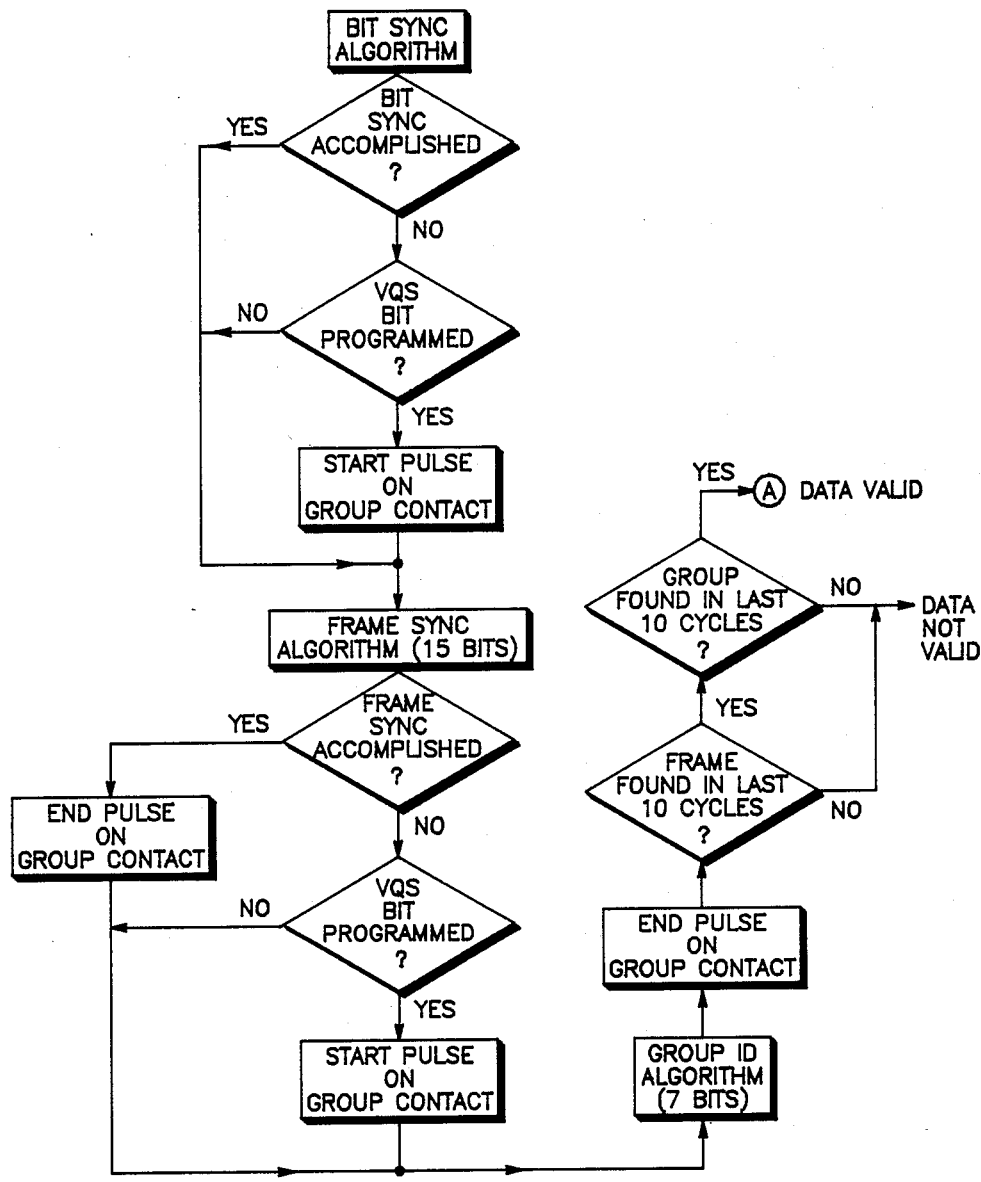
FIG. 5A is a detailed portion of a flow chart illustrating the synchronization step (step 2) of FIG. 4B.

Referring now to FIG. 5A a more detailed flow chart of the synchronization routine with QS of FIG. 4A is illustrated. In this routine the bit synchronization algorithm as described by U.S. Pat. No. 4,414,676 is used to synchronize the internal clock of the microprocessor with the data stream being generated from the encoding device. If the bit synchronization is accomplished the subroutine proceeds to a frame synchronization algorithm well known to those skilled in the art. If the bit synchronization has not been accomplished, the bit synchronization subroutine then determines whether or not the VQS bit in the codeplug has been programmed. If it has been programmed, a pulse is started on the group mode contact. This pulse ends either at the end of Frame synchronization (i.e a 0.075 second pulse duration) or at the end of group identification making a 0.110 second pulse duration. On the other hand, if the VQS bit is not programmed, the subroutine proceeds to the frame synchronization algorithm.

Once the frame synchronization algorithm is executed it is then determined if frame synchronization has been accomplished. If frame synchronization has been accomplished, the pulse on the group mode contact which was enabled due to bit synchronization is turned off resulting in a 0.075 second pulse. The subroutine then proceeds to the group ID algorithm. If frame synchronization has not been accomplished, it is determined whether or not the VQS bit in the code plug has been programmed. If the VQS bit has not been programmed, the subroutine proceeds to the group ID algorithm. If the VQs bit has been programmed, a pulse on the group mode contact is generated. The subroutine then proceeds to the group ID algorithm to determine if a group ID data has been received from the encoder. At the end of the group ID algorithm the pulse on the group contact is turned off. If the VQS codeplug bit is programmed and both bit synchronization and frame synchronization were in error, the pulse duration will be 0.110 seconds at this time. However, if only frame synchronization was in error, the pulse duration will be 0.035 seconds. The subroutine then proceeds to the valid data check algorithm. This algorithm first checks the number of consecutive times frame synchronization has been missed. If it has been missed ten consecutive times, the data is no longer valid and the subroutine returns to sync 2, 202, FIG. 4A. If the frame has not been missed ten consecutive times, the subroutine checks the number of consecutive times the group identification has been missed (note that the group ID cannot be missed in the S mode because it is ignored). If it has been missed ten consecutive times, the data is no longer valid and the subroutine returns to Sync 2, 202, FIG. 4A. If the data is valid, the subroutine proceeds to decode and alert addresses.

Figure 5B:
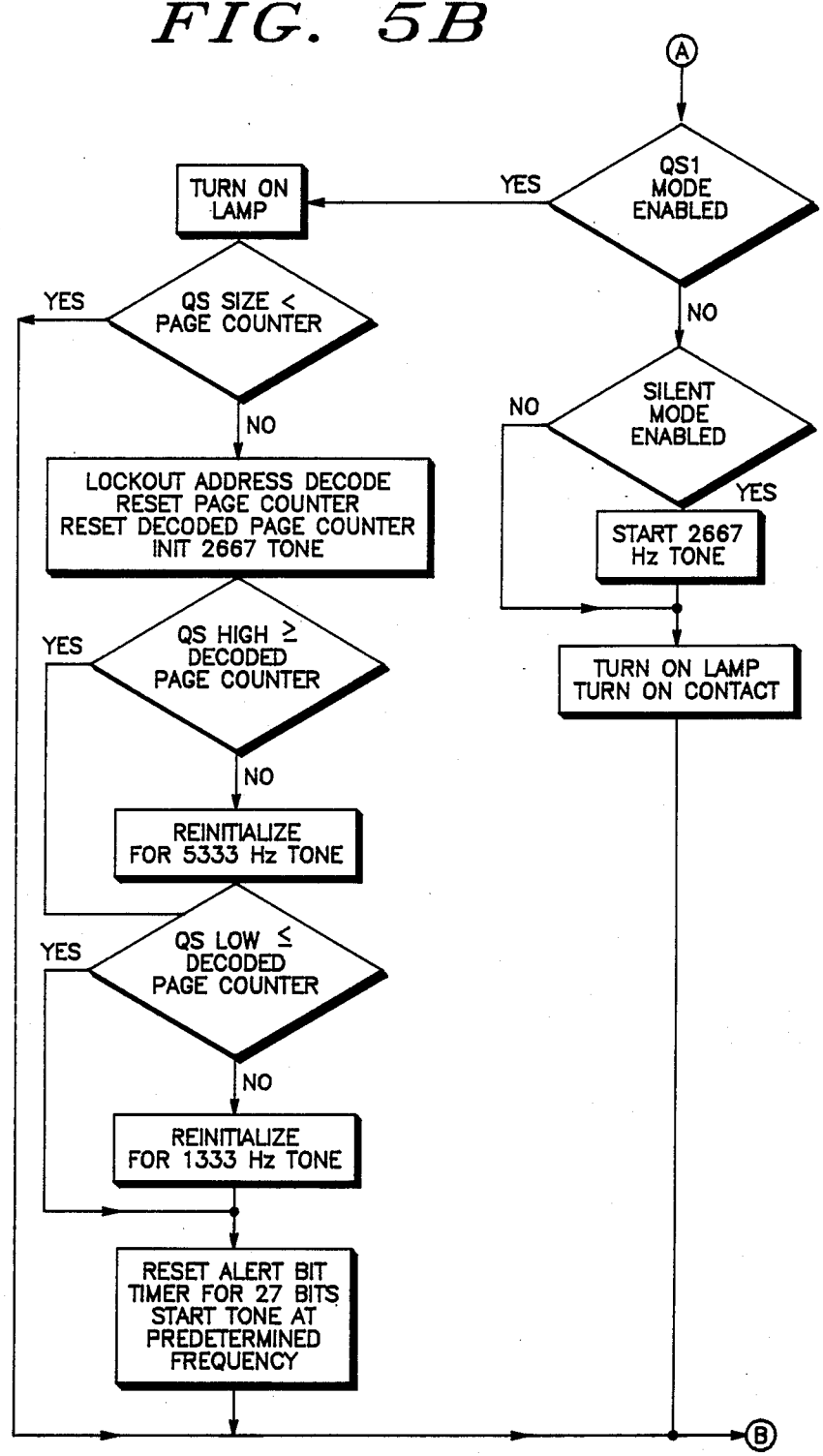
FIG. 5B is a detailed portion of a flow chart illustrating the mode selection step of FIG. 4B.

Referring now to FIG. 5B, a more detailed flow chart for the mode selection step of FIG. 4B is illustrated. For mode selection, the group mode contact in the pager is interrogated to see if the QS1 mode has been enabled. If the QS1 mode is not enabled, the QS2 mode is enabled and the subroutine proceeds to see if the silent mode has been enabled. If the the silent mode has been enabled, the subroutine proceeds to start the 2667 Hz tone. If the silent mode has not been enabled, the 2,667 Hz is not started. After either situation, the LED is illuminated and a pulse on the 20 second mode contact is generated. After that the routine proceeds to the address detecting routine.

In the event that the QS1 mode is enabled the ratio counter portion of the sub-routine then begins. In this case, the LED is energized and then the decision is made as to whether the page counter has reached the number 20 or not. The number 20 represents the codeplug variable QSSIZE as indicated earlier. If the page counter is less than 20, the subroutine proceeds to the address detecting routine. On the other hand, if the page counter is equal to the number 20, then the routine proceeds to the step in which address detecting is locked out and page counter is reset, the decoded page counter is reset and the 2,667 Hz tone is initialized representing "at threshold" sensitivity. The subroutine then proceeds to the next decision block where it is determined if the decoded page counter has a number greater than or equal to 18. The number 18 represents the codeplug variable QSHIGH as indicated earlier. If 18 is greater than or equal to the number of decoded pages the routine proceeds to the next decision. However, if the number of decoded pages is greater than 18, the 5,333 Hz tone is reinitialized representing "above threshold" sensitivity. In the next decision block, the decoded page counter is interrogated to determine if 17 is less than or equal to the number of decoded pages. The number 17 represents the code plug variable QSLOW as indicated earlier. If the number of decoded pages is less than 17, the 1,333 Hz tone is reinitialized representing "below threshold" sensitivity. However, if the number of decoded pages is greater than or equal to 17 then the subroutine proceeds to the next step where the alert bit timer is reset for 27 bits and the tone is started at the predetermined frequency. The program then proceeds to the address detecting routine which is illustrated in more detail in FIG. 5C.

Figure 5C:
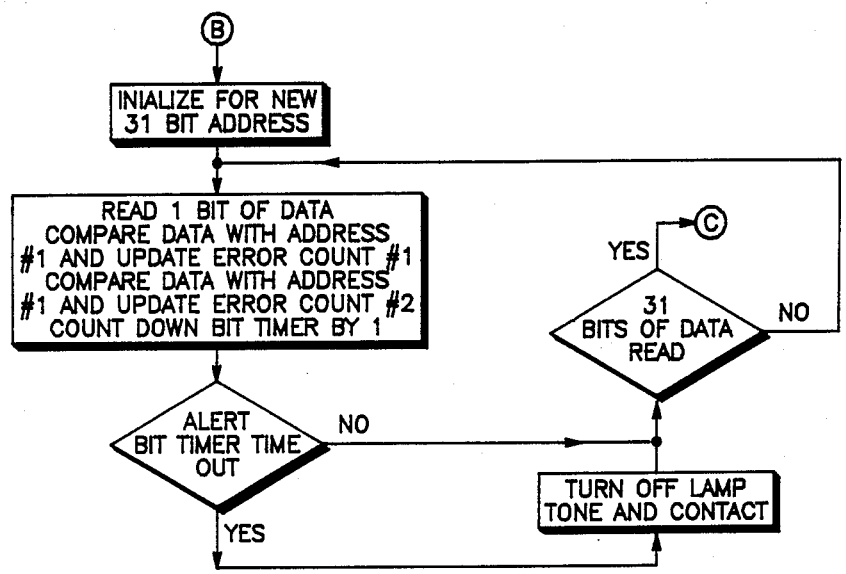
FIG. 5C is a detailed portion of a flow chart illustrating the address decoding step of FIG. 4B.

Referring now to FIG. 5C the system is initialized for receiving a new 31-bit address. After that the bit by bit comparison of data is performed in which one bit of data is read and compared with address number 1 and the error count is updated. Then the data is compared with address number 2 and the second error count is updated. Finally, the bit timer (which is initialized by either the ratio counter or the error count analyzer) is decremented by one. The subroutine then proceeds to the decision block where it is determined whether or not the bit timer has timed out (i.e. decremented to zero). If the bit timer has timed out, the subroutine proceeds to turn off the tone, the LED and the pulse on the 20 second mode contact. Regardless of whether the bit timer has timed out another decision is made as to whether or not 31 bits of data have been read. If 31 bits of data have not been read then the subroutine returns back to the block to read in another bit of data and perform the various comparisons. If 31 bits of data have been read the program proceeds to the error count analysis routine.

Figure 5D:
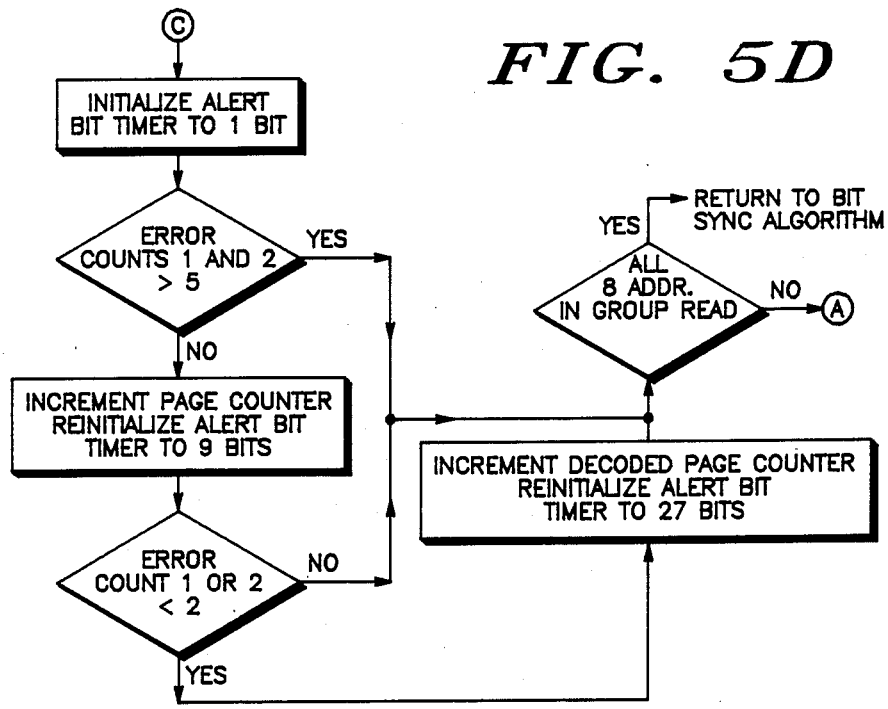
FIG. 5D is a detailed portion of a flow chart illustrating the error count analyzation step of FIG. 4B.

Referring now to FIG. 5D, a detailed flow chart of the error count analysis subroutine is illustrated. The system initializes the alert bit timer to one bit, or a 5 ms alert duration. Once the alert bit timer is initialized, the decision is made as to whether or not the first error count is greater than 5 and the second error count 2 is greater than 5. If both error counts are greater than 5, this represents a "non page" situation and the system subroutine proceeds to the last decision block to determine if all 8 addresses in the group have been read. If either error counter 1 or 2 does not have a value greater than 5, then the subroutine proceeds to increment the page counter for use by the ratio counter portion of the subroutine. The alert bit timer is also reinitialized to 9 bits which represents a 45 milliseconds alert duration, indicating a "missed page". The decision is made if either error counter 1 or 2 has a count of less than 2. If neither does, the system proceeds to the last decision block to determine if all of the addresses in the group have been read. If either of the error counters has a value of less than 2, the subroutine proceeds to increment the decoded page counter for use by the ratio counter portion of the subroutine. The alert bit is reinitialized to 27 bits which represents a 135 millisecond alert duration indicating a "decoded page". The subroutine then proceeds to the last decision to determine if all of the addresses have been read. If all 8 addresses in the group have been read, the program returns to pause 210 FIG. 4B to begin the whole process over again. If all 8 addresses in the group have not been read, then the subroutine returns to the error count analysis routine.

Figure 6:
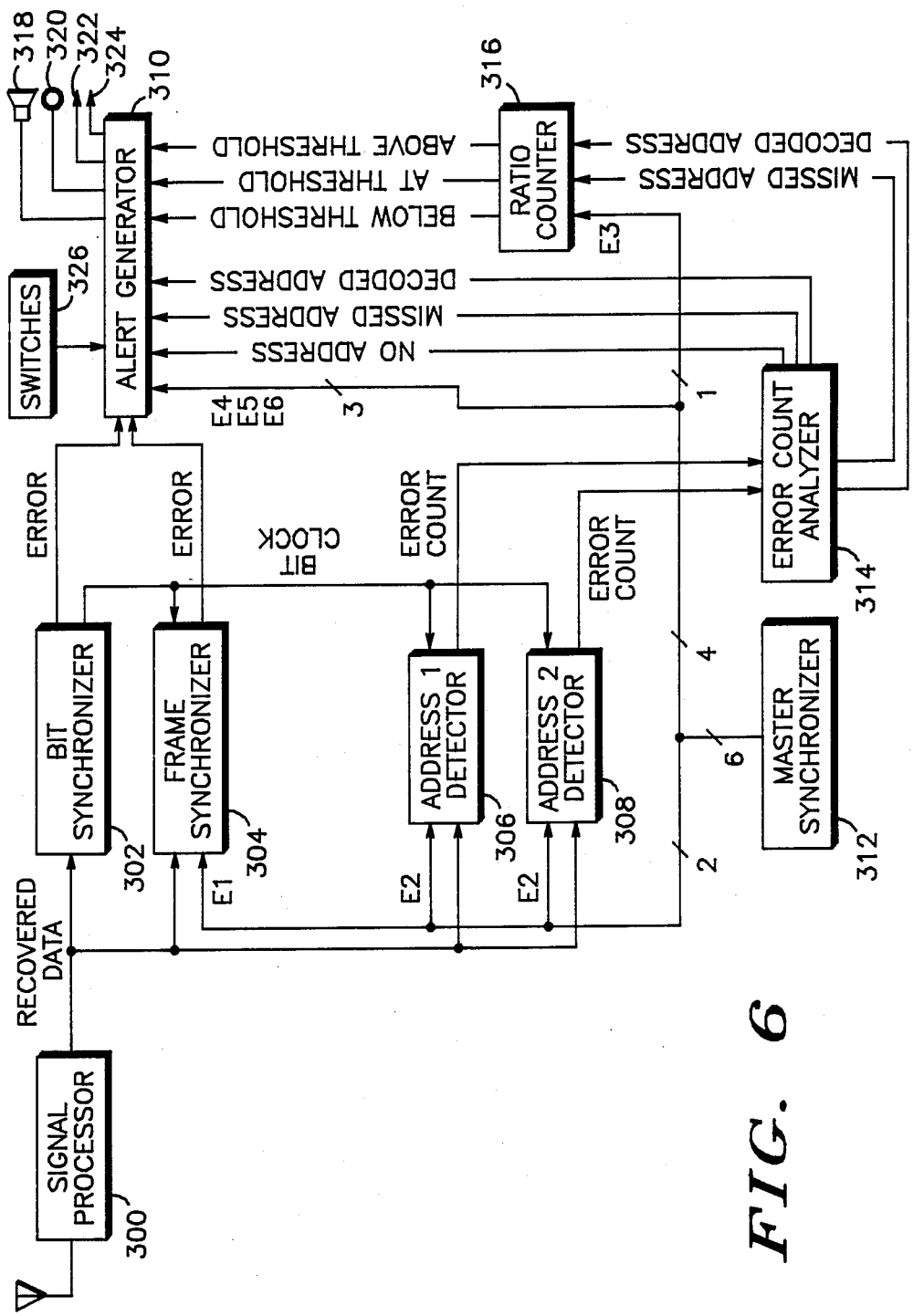
FIG. 6 is a block diagram of another embodiment of the present invention.

Referring now to FIG. 6 a block diagram of another embodiment of the present invention is illustrated. The quick sensitivity circuit comprises a paging receiver 300 which demodulates information from an RF channel and converts it into binary data. The recovered data is coupled to a bit synchronizer 302, a frame synchronizer 304 and address detectors 306 and 308.

The bit synchronizer monitors the incoming data from the signal processor 300 and determines where the bit boundries are in time. It has a timing output coupled to the frame synchronizer 304, address detectors 306 and 308 and an error output coupled to an alert generator 310. The timing output signal supplies information to the frame synchronizer 304 and address detectors 306 and 308 enabling it to sample the recovered data in an optimal mannor. When the error output is active preset conditions for finding bit synchronization are not met. The error output signals the alert generator 310 to produce a 75 ms pulse on contact.

The frame synchronizer 304 monitors incoming data from the signal processor 300 and timing information from the bit synchronizer 302. The frame synchronizer 304 searches the incoming data for a predetermined pattern indicating where the address boundries are found in the data stream. The frame synchronizer 304 is enabled by a signal from the master synchronizer 312. When preset conditions for finding frame synchronization are not met, the error output signals the alert generator 310 to produce a 35 ms pulse on contact.

The address detectors 306 and 308 monitors data from the signal processor 300 and timing information from the master synchronizer 312 and supplies address error counts to the error count analyzer 314. Each address detector compares incoming address data with its individual address. The individual addresses are read from a code plug. As the incoming address data is read in and compared with its individual address, an error count equal to the number of missmatched bits is generated. The error counts are fed to the error count analyzer 314 for analysis.

The error count analyzer 314 analyzes error counts from the address detectors 306 and 308 and generates page status signal to the alert generator 310 and/or the ratio counter 316. The error count analyzer 314 generates three types of page statuses:

| PAGE TYPE | CONDITION |
| --- | --- |
| Decoded Page | any single error count < X |
| Missed Page | any error count <= Y but all error counts => X |
| No Page | all error counts > Y |

The values X and Y can be any number. For this system X=2, the number of allowable bit corrections in an address plus one, Y=5, the hamming distance of this coding system. If the page status is sent to the alert generator 310, the page type will be alerted as follows:

| PAGE TYPE | CONDITION |
| --- | --- |
| Decoded Page | 135 ms |
| Missed Page | 45 ms |
| No Page | 5 ms |

The alert generator 310 will enable either a 2667 Hz transducer tone and/or a lamp flash and/or a high to low state on an electrical contact for the proper page type alert duration.

The ratio counter 316 when enabled by the master synchronizer 312 processes the missed page and decoded page status from the error count analyzer 314 with timing information from the master synchronizer 312 and sends above, at, and below threshold signals to the alert generator 310. The ratio counter 316 sums the number of decoded and missed pages (note that the no page signal is not used) and when the sum reaches a predetermined value (A), it compares the number of decoded pages with the two other predetermined values (B and C). The result of the comparison is a determination of the paging threshold sensitivity; above threshold, at threshold or below threshold. The determination is made and the alert generator 310 generates alert tones as follows; with A samples;

| PAGING SENSITIVITY | DECODED PAGE COUNT | ALERT FREQUENCY |
| --- | --- | --- |
| Above threshold | B < Decoded Page Count | 5333 Hz |
| At Threshold | C <= Decoded Page Count <= B | 2667 Hz |
| Below Threshold | Decoded Page Count < C | 1333 Hz |

The values A, B, and C are code plug selectable and have default values of A=20 QSSIZE, B=18 QSHIGH and C=17 QSLOW.

The alert generator 310 contains a tone generator and signal amplifier for the transducer 318 and an amplifier for the lamp 320 and two electrical contacts 322 and 324. All of these outputs are responsive to inputs from the bit synchronizer 302, frame synchronizer 304, error count analyzer 314 and ratio counter 316. It also has a QS1 selection switch and a silent mode selection switch shown as 326.

The master synchronizer 312 provides enabling and timing information to keep the system synchronized. These signals are supplied to the frame synchronizer 304, address detectors 306 and 308, ratio counter 316 and alert generator 310.

The bit synchronizer 302 is illustrated as FIG. 2B in U.S. Pat. No. 4,414,676 and totally described therein. It analyzes the data from the signal processor 300 and produces a bit clock output for the frame synchronizer 304 and address detectors 306 and 308. It has an error output that is active if bit synchronization is obtainable from the received data. The error output is coupled to the alert generator 310.

Referring now to FIG. 7 a detailed diagram of the frame synchronizer 304 is illustrated. The frame synchronizer 304 comprises a 15 bit serial shift register 400 and a 15 bit comparator 402. The 15 bit comparator 402 compares the contents of the serial shift register 400 with a predetermined 15 bit frame sync code 404. The code is 1000 1001 1010 111. After bit sync, the next 15 bits are shifted in and compared with the frame sync code. If they are equal, the output is 0, if they are not equal the output is 1. The output is coupled to the alert generator 310. The data is received from the signal processor 300 and the bit clock is generated by the bit synchronizer 302. The circuit is enabled by a signal E1 from the master synchronizer 312.

Referring now to FIG. 8 a detailed diagram of the address detector 306 and 308 is illustrated. The address detector 306 and 308 compares the received data with a predetermined code plug address and counts the number of bits that do not match. The 31 bit code plug address is held in a 31 bit register 500, and loaded into a 31 bit parallel in serial output shift register 502 on the possitive edge of the enable signal, E2 from the master synchronizer 312. Data from the signal processor 300 is latched by a D flip flop 504 on timing from the bit clock from the bit synchronizer 303. The latched data from the D flip flop 504 is compared by an EXCLUSIVE OR gate 506 with data shifted out of the register 502. If the latched data bit is different from the corresponding code plug bit, EXCLUSIE OR gate 506 enables the 5 bit up counter 508 to count the error. The counter 508 is clocked by the bit clock, reset by the inactive state of E2 and enabled by the EXCLUSIVE OR ate 506. The error count of the up counter 508 is coupled to the error count analyzer 314 of FIG. 6.

Figure 9:
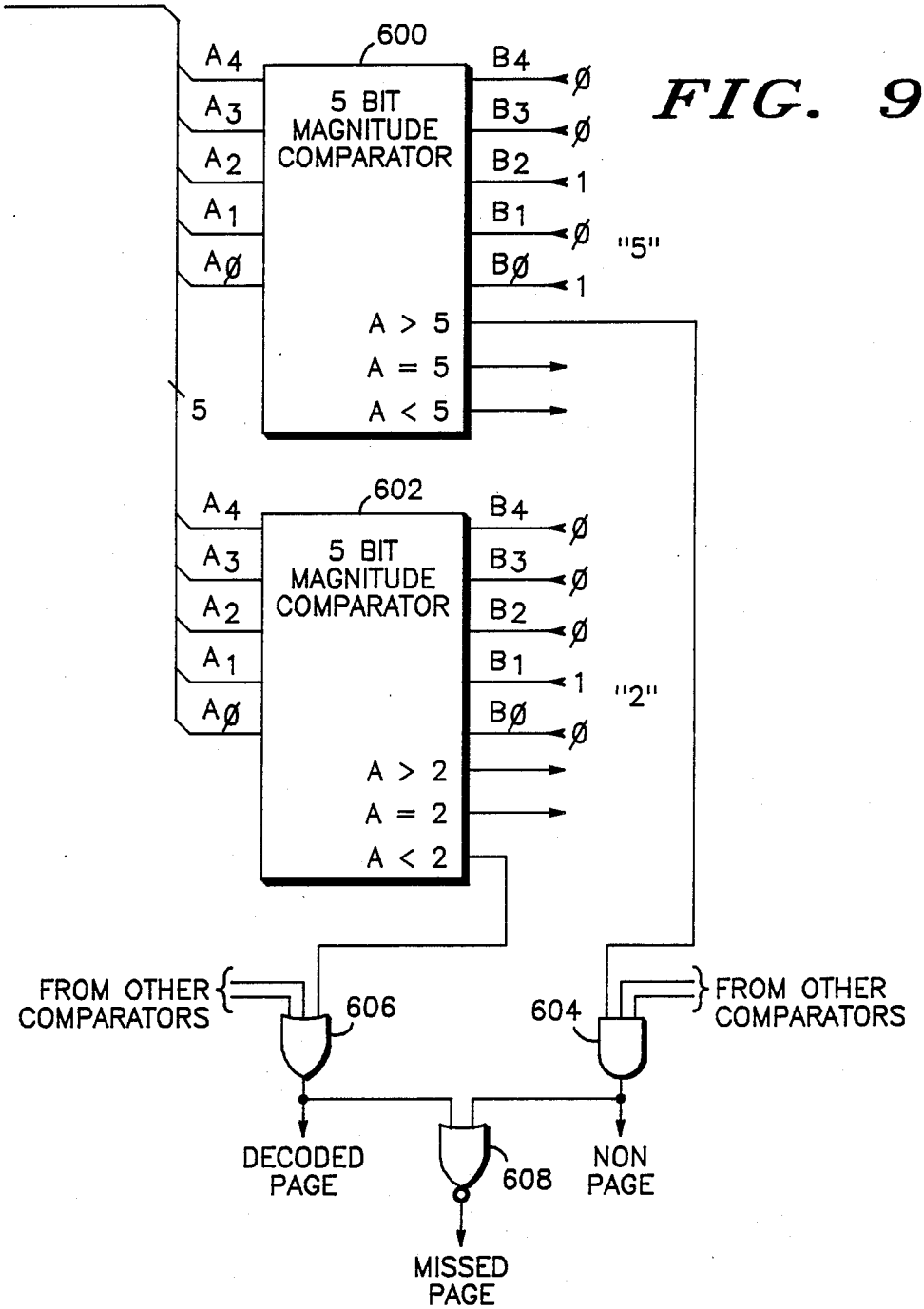
FIG. 9 is a detailed schematic diagram of the error count analyzer of FIG. 6.

Referring now to FIG. 9 a detailed drawing of the error count analyzer 314 is illustrated. The error count analyzer 314, analyzes the error count from the address detectors 306 and 308. If both of the address detectors 306 and 308 have an error count greater than "5" then a non page status is generated. If either of the address detectors 306 or 308 have an error count less than '2' then a decoded page status is generated. Otherwise, a missed page status is generated. The error count analyzer 314 comprises a pair of five bit magnitude comparators 600 and 602 for each address detector 306 and 308. In this instance an example for the address detector 306 is described. The error count from the address detector 306 is coupled to the A input of two five bit magnitude comparators 306 and 308. The first comparator 600 compares the error count with the constant five and has an active output if the error count is greater than five. The output is coupled to an AND gate 604 which has as many inputs as there are address detectors, in this case 2. An active output is generated by AND gate 604 if all error count comparisons are greater than five. The second five bit comparator 602 compares the error count with a constant two. The ouput of the comparator 602 is active if the error count is less than two. The output from comparator 602 is coupled to an OR gate 606. The OR gate 606 has as many inputs as there are address detectors. An active output is generated by OR Gate 606 if any error count comparison is less than two, NOR gate 608 has inputs coupled to AND gate 604 and OR gate 606. NOR gate 608 is active if the other gates 604 and 606 are inactive. The outputs of gates 604, 606 and 608 are coupled to the alert generator 310, while the outputs of gates 606 and 608 are coupled to the ratio counter 316.

Figure 10:
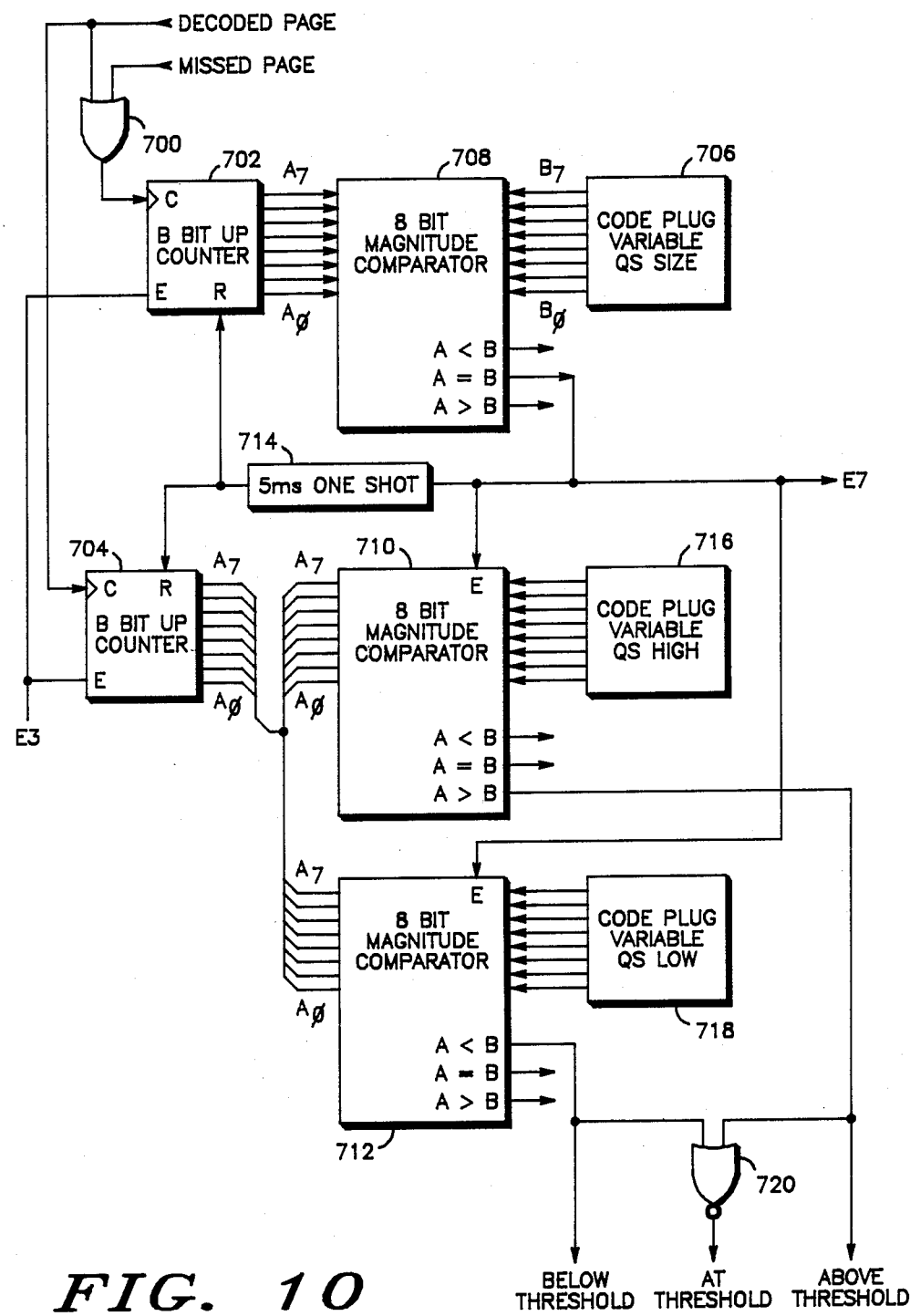
FIG. 10 is a detailed schematic diagram of the ratio counter of FIG. 6.

Referring now to FIG. 10 a detailed drawing of the ratio counter 316 is illustrated. The ratio counter 316 determines the QS1 alert type. After QSSIZE pages are decoded or missed. The ratio counter 316 generates a below threshold signal if the decode page count is less than QSLOW, an above threshold signal if the decode page count is greater than QSHIGH, or otherwise an at threshold signal. The results of missed pages and decoded page signals from the error count analyzer 314 are combined by OR gate 700 and counted by the 8 bit up counter 702. The decoded pages are counted by the 8 bit up counter 704. Both counters 702, 704 are enabled by signal E1 from the master synchronizer 312. The value in counter 702 is compared with a register 706 containing the code plug variale QS SIZE by an 8 bit magnitude comparator 708. When they are equal the output of comparator 708 becomes active, enabling comparator 710 and 712 and triggering a 5 mS one shot 714 to reset the two counters 702 and 704. When enabled by comparator 708, comparators 710 and 712 compare the decoded page count in counter 704. Comparator 710 has an active output corresponding to above threshold sensitivity if the decoded page value in counter 704 is greater than the code plug variable QS HIGH stored in register 716. Comparator 712 has an active output corresponding to a below threshold sensitivity if the decoded page value in counter 704 is less than the code plug variable QSLOW stored in register 718. The output of NOR gate 720 is active, corresponding to an at threshold sensitivity, only if the outputs of comparators 710 and 712 are inactive. The outputs of comparators 710 and 712 and the output of NOR gate 720 are coupled to the alert generator 310 along with an enabling signal E7.

Figure 11:
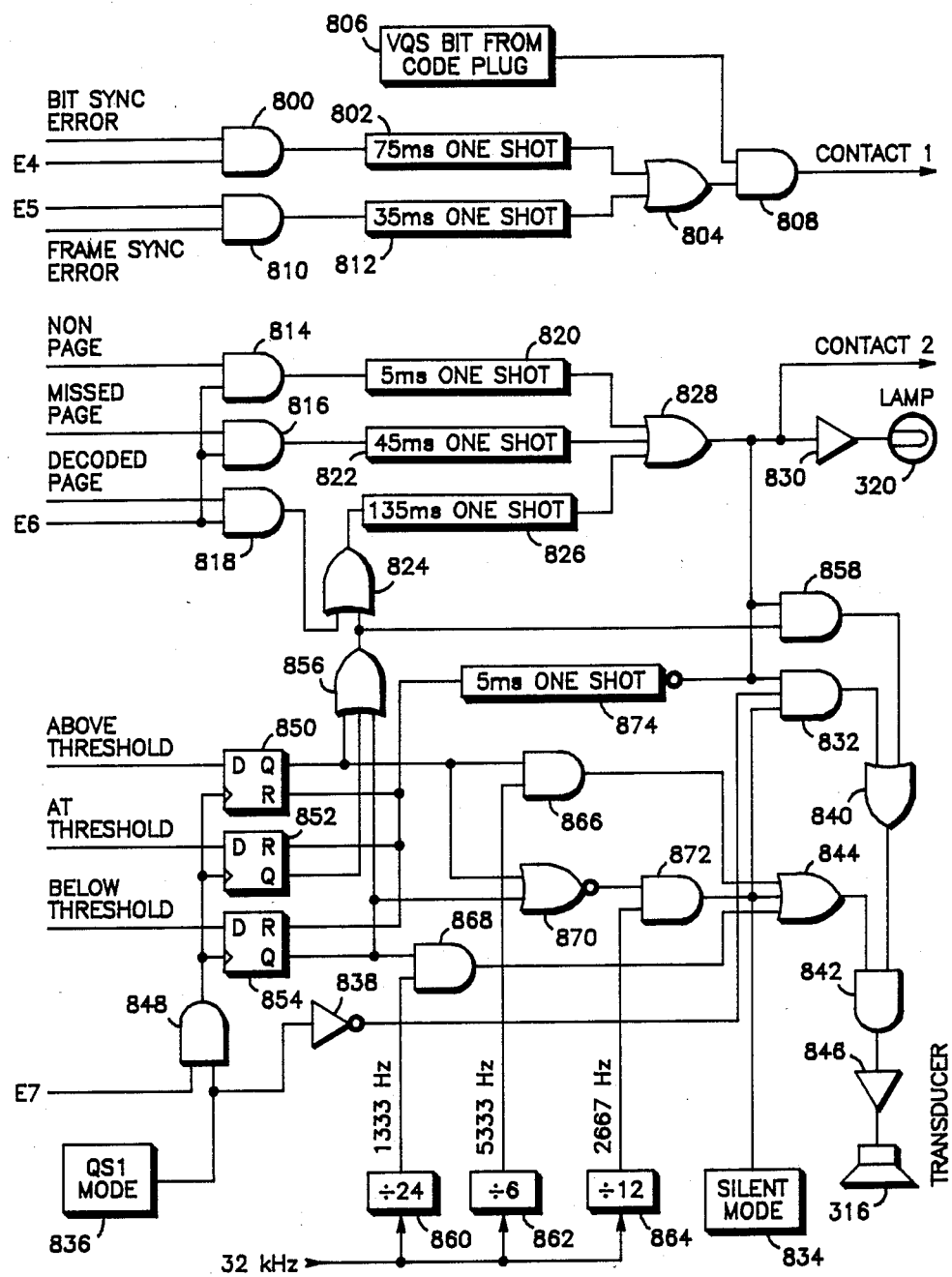
FIG. 11 is a detailed schematic diagram of the alert generator of FIG. 6.

Referring now to FIG. 11, a detailed drawing of the alert generator 310 is illustrated. The alert generator 310 generates the QS1 and QS2 alert sequences. The bit and frame sync errors signal appear as pulses on contact 1 (322 of FIG. 6) if a bit or frame sync error occurs and the code plug VQS bit is programmed. AND gate 800 gates the error signal from the bit synchronizer 302 with a timing signal E4 from the master synchronizer 312. IF both are active, a 75 ms one shot 802 is triggered. The output of the one shot 802 passes through OR Gate 804 and is gated by the code plug VQS bit 806 by means of AND gate 808. The output of AND gate 808 is also connected to contact 1. AND gate 810 gates the error signal from the frame synchronizer 304 with a timing signal E5 from the master synchronizer 312. If both are active, a 35 ms one shot 812 is triggered. The output of the one shot 812 passes through OR 804 and is gated by the code plug VQS bit 806 by means of AND gate 808. The output of AND gate 808 is also connected to contact 1.

The QS2 alert status appears on contact 2 (324 of FIG. 6), the lamp 320 of FIG. 6 and if the silent mode is active and the QS1 mode non-ative, the transducer 318 of FIG. 6. QS2 page status is generated by the error count analyzer 314. A 5 ms alert is generated if a non page status occurs, a 45 ms alert is generated if a missed page status occurs and a 135 ms alert is generated if a decoded page status occurs. The non page, missed page and decoded page status signals from the error count analyzer 314 are gated with a timing signal E6 from the master synchronizer 312 by AND gates 814, 816 and 818 respectively and coupled to a 5 ms one shot 820, a 45 ms one shot 922 and through OR gate 824 to a 135 ms one shot 826 respectively. The output of the selected one shot passes through OR gate 828, appears on contact 2, and is amplified by amplifier 830 to drive a lamp 320 of FIG. 6. AND gate 832 gates the one shot pulse with the silent mode selection switch 834 and the inactive QS1 mode slection switch 836 through inverter 838. If the QS1 mode is not selected, and the silent mode is selected, AND gate 832 passes the one shot pulse through OR gate 840 and into AND gate 842 which enables a 2667 Hz signal normally on OR gate 844 to go into transducer amplifier 846 and excite transducer 318 at a frequency of 2667 Hz for a duration equal to that of the one shot by the error count analyzer 314. Thus the QS2 alert sequence is generated.

The QS1 alert works on signals from the ratio counter 316. If it is determined that the RF level is above threhold sensitivity a 5333 Hz tone is generated; If the RF level is at threhold sensitivity a 2667 Hz tone is generated. IF the RF level is below threshold sensitivity a 1333 Hz tone is generated. The tone duration is 135 ms and is accompanied by a lamp flash an a contact pulse for the same 135 ms duration. An enabling signal E7 fromt he ratio counter 316 is gated by AND gate 848 with the QS1 mode selection switch 836. If both are active, the above, at and below threshold signals from the ratio counter 316 are latched by flip flops 850, 852 and 854 respectively. The selected output passes through OR gates 856 and 824 triggering the 135 ms one shot 826 whos pulse passes through OR gate 828, through AND gate 842 which enables a selected frequency from OR gate 844 to amplifier 846 exciting transducer 318 at the selected frequency for the 135 mS pulse duration. the 135 ms pulse from OR gate 828 also appears on contact 2 and lamp 320 through amplifier 830. The selected frequency is derived from a 32 kHz signal from the master synchronizer 312. A divide by 24 circuit 860 generates a 1333 Hz, a divide by 6 circuit 862 generates 5333 Hz and a divide by 12 circuit 864 generates 2667 Hz. If above threshold is latched by flip flop 850, AND gate 866 enables the 5333 Hz from divider 862 to OR Gate 844. If the below threshold is latched by flip flop 854 AND gate 868 enables the 1333 Hz from device 860 to OR gate 84. IF neither above or below thresholds flip flops 850 and 854 are latched, then NOR gate 870 enables AND gate 872 to pass 2667 Hz from divider 864 to OR gate 844. After completion of the one shot pulse from OR gate 828, flip flops 850, 852 and 854 are reset by the 5 ms one shot 874.

Referring now to FIG. 12, a detailed drawing of the master synchronizer 312 is illustrated. The master synchronizer 312 provides a 32 kHz time base for the alert generator 310 and enabling signals to the frame synchronizer 304 address detectors 306 and 308, ratio counter 316 and alert generator 310. The master synchronizer comprises a 32 kHz crystal 900 and oscillator circuit 902. The output of the oscillator 902 is coupled to the alert generator 310. The 32 kHz is also directed to a divide by 80 circuit 904 which generates a 400 Hz squarewave to a 10 bit up counter 906b which resets after 558 counts. The counter 906 drives a 1k×6 ROM 90-8 that has been programmed to generate the wave forms shown in FIGS. 13A, 13B and 13C. The wave forms generated by ROM 908 are two cycle types having a pattern of 1 cycle 1 and 8 cycle 2's as illustrated in FIG. 13A. FIG. 1B shows waveforms generated during cycle 1. The data from signal processor 300 is shown to be a synchronization word. The corresponding enable signals are also shown. FIG. 1C shows waveforms generated during cycle 2. The data from the signal processor 300 is an address word. The corresponding enable signals are also shown. The enable signals work to keep the system in synchronization and are counted as follows: E1 to the frame synchronizer 304; E2 to the address detectors 306 and 308; E3 to the ratio counter 316; and E4, E5 and E6 to the alert generator 310.

Obviously, numerous (additional modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A method of testing a receiver capable of receiving at least one group of transmitted signals, said method comprising the steps of:
    transmitting at least one group of signals of a plurality of groups to the receiver, the at least one group of signals including at least one test code;
    detecting at the receiver the transmitted signals;
    decoding each group of transmitted signals for producing a decoded signal, each decoded signal including a decoded test code;
    comparing the decoded test code of each said decoded signal with a reference signal having a test code identical to the transmitted test code to determine the degree of similarly between each said decoded signal and said reference signal;
    classifying into at least three classifications of said decoded signal in accordance with the difference between the decoded test code and the identical test code of said reference signal;
    generating a signal indicative of the classification of each of the decoded signals.

2. A method, according to claim 1, further comprising the step of:
    generating an alert in response to each of said classification signal such that the classification of each of the detected signals is discernible.

3. The method, according to claim 2, wherein said step of comparing each of the decoded signals, each said decoder signal being comprised of at least one symbol, includes the step of:
    determining the number of non-corresponding symbols between each said decoded signal and said reference signal whereby each said decoded signal may be classified in accordance with the number of non-corresponding symbols.

4. The method, according to claim 3, wherein the step of generating an alert includes the step of:
    varying the frequency of said alert whereby each different frequency of said alert represents a respective classification for at least one of said decoded signals.

5. The method, according to claim 3, wherein step of generating an alert includes the step of:
    varying the duration of said alert whereby each different duration of said alert represents a respective classification for at least one of said decoded signals.

6. The method, according to claim 2, wherein the step of generating an alert includes the step of:
    varying the frequency of said alert whereby each different frequency of said alert represents a respective classification for at least one of said decoded signals.

7. The method, according to claim 2, wherein step of generating an alert includes the step of:
    varying the duration of said alert whereby each different duration of said alert represents a respective classification for at least one of said decoded signals.

8. The method, according to claim 1, wherein said step of comparing each of the decoded signals, each said decoded signal being comprised of at least one symbol, includes the step of:
    determining the number of non-corresponding symbols between each said decoded signal and said reference signal whereby each said decoded signal may be classified in accordance with the number of non-corresponding symbols.

9. A receiver capable of receiving at least one group of transmitted signals, each said transmitted signal being comprised of at least one symbol, comprising:
    detecting and decoding means, for detecting and decoding each said transmitted signal from said at least one group of transmitted signals to obtain a decoded signal;
    memory means, for storing a reference signal having a reference symbol identical to the transmitted symbol;
    comparing means, coupled to said detecting and decoding means and said memory means, for comparing the symbol for each said decoded signal with reference symbol of said reference signal and for generating a signal indicative of the degree of similarly between each said decoded signal and said reference signal;
    classifying means, coupled to said comparing means, for classifying into at least three classifications each of the decoded signals, for generating a signal indicative of the classifications of each said decoded signal.

10. The receiver, according to claim 9, further comprising:
    alert means, coupled to said classifying means, for generating an alert in response to said classification signal.

11. The receiver, according to claim 9, wherein:
    said comparing means compares each symbol of said decoded signal with a corresponding symbol of said reference signal and generates a signal indicative of the number of dissimilar symbols between said decoded signal and said reference signal.

12. The receiver, according to claim 11, wherein:
said classifying means generates said classification signal in accordance with the number of dissimilar symbols between said decoded signal and said reference signal.

13. A method for evaluating the performance of a receiver capable of receiving at least one group of signals, said method comprising the steps of
   (a) transmitting at least one group of signals of a plurality of groups to the receiver, that at least one group of signals including at least one predetermined bit pattern;
   (b) receiving at the receiver the group of signals;
   (c) decoding each group of signals to recover each bit pattern;
   (d) comparing each of the decoded bit pattern bit by bit to a reference bit pattern identical to the predetermined bit pattern for determining the number of bit differences;
   (e) classifying into a plurality of error conditions, the decoded signal according to the number of bit differences; and
   (f) generating a value for each of the error conditions to evaluate the performance of the receiver.

14. The method of claim 13 further comprising the steps of:
   generating an alert in response to each of the error condition values.

15. The method of claim 14 further comprising the step of:
   varying the frequency of the alert whereby each different frequency of the alert represents a corresponding error condition value for each decoded signal.

16. The method of claim 13 comprising the step of:
   varying the duration of the alert whereby each different duration of the alert represents a respective error condition for at least one of the decoded signals.

17. The method of claim 13 wherein the step (d) of comparing further includes the steps of:
   (g) comparing the decoded bit pattern bit by bit to a plurality of reference bit patterns for determining a plurality of errors values, each error value indicative of the number of bit differences;
   (h) selecting from the plurality of error values, the error value with the least number of bit differences.

18. The method of claim 13 further including the steps of:
   (i) repeating from step (a) of transmitting through step (f) of generating until the values for a select number of the plurality of error conditions reach a predetermined limit;
   (j) classifying the plurality of error conditions into a plurality of classifications according to a predetermined statistical determination; and
   (k) generating a value for each of the classifications to evaluate a sensitivity for the receiver.

19. The method of claim 18 wherein step (k) of classifying further includes the steps of:
   (l) determining a ratio for each error condition value compared to a total for the error condition values; and
   (m) classifying the ratios into the plurality of classification values.

20. The method of claim 18 further comprising the step of:
   generating an alert in response to each of the classification values.

21. The method of claim 20 further comprising the step of:
   varying the frequency of the alert whereby each different frequency of the alert signal represents a corresponding classification value.

22. The method of claim 18 comprising the step of:
   varying the duration of the alert whereby each different duration of the alert represents a respective classification value for the receiver.

* * * * *